(12) United States Patent
Seghi et al.

(10) Patent No.: US 10,106,880 B2
(45) Date of Patent: Oct. 23, 2018

(54) MODIFYING THE SURFACE CHEMISTRY OF A MATERIAL

(71) Applicant: The United States of America as represented by the Secretary of the Navy, Washington, DC (US)

(72) Inventors: Steven Seghi, Bloomington, IN (US); Jason Kalishek, Bloomington, IN (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 463 days.

(21) Appl. No.: 15/077,352

(22) Filed: Mar. 22, 2016

(65) Prior Publication Data
US 2016/0201184 A1    Jul. 14, 2016

Related U.S. Application Data

(63) Continuation-in-part of application No. 14/587,455, filed on Dec. 31, 2014.
(Continued)

(51) Int. Cl.
*C23C 8/26* (2006.01)
*C23C 8/24* (2006.01)
(Continued)

(52) U.S. Cl.
CPC ............ *C23C 8/26* (2013.01); *B23K 26/0006* (2013.01); *B23K 26/0066* (2013.01);
(Continued)

(58) Field of Classification Search
CPC ......... C23C 8/26; C23C 8/24; B23K 26/0066; B23K 26/352; B23K 26/0006
(Continued)

(56) References Cited

U.S. PATENT DOCUMENTS 5,558,789 A    9/1996  Singh
6,159,832 A    12/2000 Mayer
(Continued)

FOREIGN PATENT DOCUMENTS

WO  PCT/US2007/079897    8/2008
WO  WO2012163351 A1      12/2012
WO  WO2014025332 A1      2/2014

OTHER PUBLICATIONS ntrs.nasa.gov/serach.jsp?R=20130013699; "Supersonic Retropulsion Surface Preparation of Carbon Fiber Reinforced Epoxy Composites for Adhesive Bonding", Frank L. Palmieri, Marcus A. Belcher, Christopher J. Wohl, Kay Y. Blohowiak, and John W. Connell; publication date: May 6, 2013; 14 pages.
(Continued)

*Primary Examiner* — Samuel M Heinrich
(74) *Attorney, Agent, or Firm* — Christopher A. Monsey

(57) ABSTRACT

Embodiments disclosed herein generally relate to modifying a material's surface chemistry and surface profile using a pulsed laser. In embodiments, a system comprises: a material, the material including a surface portion having a surface chemistry; an enclosure, the enclosure containing a gaseous mixture having a non-atmospheric composition; and a pulsed laser configured to emit at least one laser pulse, the at least one laser pulse being directed to pass through the gaseous mixture onto the surface portion thereby modifying the surface chemistry of the surface portion.

43 Claims, 22 Drawing Sheets

Related U.S. Application Data

(60) Provisional application No. 62/272,392, filed on Dec. 29, 2015, provisional application No. 61/922,934, filed on Dec. 31, 2013.

(51) Int. Cl.
| | | |
|---|---|---|
| *B23K 26/352* | (2014.01) | |
| *B23K 26/00* | (2014.01) | |
| *B23K 26/0622* | (2014.01) | |
| *B23K 26/12* | (2014.01) | |
| *B23K 26/14* | (2014.01) | |
| B23K 103/00 | (2006.01) | |
| B23K 103/12 | (2006.01) | |
| B23K 103/16 | (2006.01) | |
| B23K 103/04 | (2006.01) | |
| B23K 103/08 | (2006.01) | |
| B23K 103/10 | (2006.01) | |
| B23K 103/14 | (2006.01) | |

(52) U.S. Cl.
CPC ...... *B23K 26/0084* (2013.01); *B23K 26/0624* (2015.10); *B23K 26/123* (2013.01); *B23K 26/126* (2013.01); *B23K 26/14* (2013.01); *B23K 26/352* (2015.10); *C23C 8/24* (2013.01); B23K 2103/04 (2018.08); B23K 2103/08 (2018.08); B23K 2103/10 (2018.08); B23K 2103/12 (2018.08); B23K 2103/14 (2018.08); B23K 2103/16 (2018.08); B23K 2103/52 (2018.08); B23K 2103/56 (2018.08); B23K 2203/00 (2013.01); B23K 2203/04 (2013.01); B23K 2203/08 (2013.01); B23K 2203/10 (2013.01); B23K 2203/12 (2013.01); B23K 2203/14 (2013.01); B23K 2203/16 (2013.01); B23K 2203/42 (2015.10); B23K 2203/50 (2015.10); B23K 2203/52 (2015.10); B23K 2203/54 (2015.10); B23K 2203/56 (2015.10)

(58) Field of Classification Search
USPC .......................... 219/121.68, 121.69, 121.86
See application file for complete search history.

(56) References Cited

U.S. PATENT DOCUMENTS

| | | | |
|---|---|---|---|
| 6,312,768 B1 | 11/2001 | Rode et al. | |
| 7,103,076 B2 | 12/2006 | Kitaoka | |
| 8,486,073 B2 * | 7/2013 | Lappalainen | A61F 2/30767 427/2.26 |
| 2002/0173778 A1 | 11/2002 | Knopp et al. | |
| 2005/0173387 A1 | 8/2005 | Fukuyo et al. | |
| 2005/0274702 A1 | 12/2005 | Deshi | |
| 2006/0039419 A1 | 2/2006 | Deshi | |
| 2006/0138102 A1 | 6/2006 | Sawada et al. | |
| 2007/0051706 A1 | 3/2007 | Bovatsek et al. | |
| 2007/0225785 A1 * | 9/2007 | Park | A61L 27/50 607/116 |
| 2008/0124486 A1 | 5/2008 | Sawada et al. | |
| 2010/0047587 A1 | 2/2010 | Itoh et al. | |
| 2010/0084384 A1 | 4/2010 | Bovatsek et al. | |
| 2010/0143744 A1 * | 6/2010 | Gupta | B23K 26/0084 428/601 |
| 2010/0219506 A1 | 9/2010 | Gupta et al. | |
| 2011/0207328 A1 | 8/2011 | Speakman | |
| 2011/0248372 A1 | 10/2011 | Kurita | |
| 2012/0067855 A1 | 3/2012 | Guo et al. | |
| 2012/0328905 A1 | 12/2012 | Guo et al. | |
| 2013/0344302 A1 | 12/2013 | Helie et al. | |
| 2014/0154526 A1 | 6/2014 | Guo et al. | |
| 2014/0239552 A1 | 8/2014 | Srinivas et al. | |
| 2014/0273535 A1 | 9/2014 | Gupta et al. | |
| 2014/0332499 A1 | 11/2014 | Palmaz et al. | |
| 2015/0038313 A1 | 2/2015 | Hosseini | |
| 2015/0064407 A1 | 3/2015 | Bruck et al. | |
| 2017/0182558 A1 * | 6/2017 | Shimizu | B22F 3/1055 |

OTHER PUBLICATIONS

Yasumaru, N. et al., *Femtosecond-laser-induced nanostructure formed on hard think films of TiN and DLC*, Appl. Phys. A 76, 983-985 (2003); 3 pages.

Hiraoka, H. et al., *Laser-Induced Sub-Half-Micrometer Periodic Structure on Polymer Surfaces*, Applied physics letters, v. 64, (5), Jan. 31, 1994, 1 page.

Derrien, Thibault et al., *Rippled area formed by surface plasmon polaritons upon femtosecond laser double-pulse irradiation of silicon*, Optics Express, Dec. 2, 2013, vol. 21, No. 24; 13 pages.

Balling, Peter, et al., *Short-pulse metal structuring: a method for modifying surface adhesion properties*, Proc. of SPIE vol. 6880; 9 pages.

Brown, Matthew S. and Arnold Craig B., *Fundamentals of Laser-Material Interaction and Application to Multiscale Surface Modification*, 2010, pp. 91-120, Springer Berlin Heidelberg.

* cited by examiner

MODIFYING THE SURFACE CHEMISTRY OF A MATERIAL

CROSS-REFERENCE TO RELATED APPLICATIONS

The present application claims the benefit of priority under 35 U.S.C. § 119(e) of U.S. Provisional Patent Application Ser. No. 62/272,392, entitled "MODIFYING THE SURFACE CHEMISTRY OF A MATERIAL," filed on Dec. 29, 2015. This application is also a Continuation-In-Part of U.S. application Ser. No. 14/587,455 filed Dec. 31, 2014, entitled "ADHESION IMPROVEMENT VIA MATERIAL NANOSTRUCTURING OR TEXTURIZING," which claims the benefit of and priority to U.S. Provisional Patent Application Ser. No. 61/922,634, filed Dec. 31, 2013, entitled "ADHESION IMPROVEMENT VIA SURFACE NANOSTRUCTURING," all of which are hereby incorporated herein by reference in their entireties for all purposes.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,332) is assigned to the United States Government and is available for licensing for commercial purposes. Licensing and technical inquiries may be directed to the Technology Transfer Office, Naval Surface Warfare Center Crane, email: Cran_CTO@navy.mil.

TECHNICAL FIELD

Embodiments of the present disclosure generally relate to modifying a material's surface chemistry using a pulsed laser. Additionally, the embodiments of the present disclosure relate to modifying a surface profile of a material using a pulsed laser. In embodiments, the pulsed laser is an ultrashort pulsed laser.

BACKGROUND

Different chemical compositions provide advantages over other chemical compositions in certain circumstances. For example, titanium nitride, which is extremely hard, offers advantages over titanium oxide, pure titanium and/or other titanium alloys (collectively referred to herein as titanium) when used as a surface coating. Another example is Magnetite ($Fe_3O_4$), which provides advantages over red iron oxide ($Fe_2O_3$) due to its environmental resistance.

SUMMARY

Embodiments of the present disclosure include systems and methods for modifying the surface chemistry of a material.

In an embodiment of the present disclosure, a system for modifying the surface chemistry of a material includes a material. The material includes a surface portion having a surface chemistry. Additionally, the system includes an enclosure that contains a gaseous mixture having a non-atmospheric composition. Furthermore, the system includes a pulsed laser configured to emit at least one laser pulse. The at least one laser pulse is directed to pass through the gaseous mixture onto the surface portion, thereby modifying the surface chemistry of the surface portion.

In another embodiment of the present disclosure, a system for modifying the surface chemistry of a material includes a material. The material includes a surface portion having a surface chemistry. The system also includes a gaseous mixture introducer. The gaseous mixture introducer is configured to introduce a gaseous mixture having a non-atmospheric composition across the surface portion. Additionally, the system includes a pulsed laser configured to emit at least one laser pulse. The at least one laser pulse is directed to pass through the gaseous mixture onto the surface portion, thereby modifying the surface chemistry of the surface portion.

In even another embodiment of the present disclosure a system for modifying the surface chemistry of a material. The material including a surface portion having a surface chemistry. The system also includes at least one of a liquid substance and a solid substance disposed proximal to the surface portion and a pulsed laser configured to emit at least one laser pulse. The at least one laser pulse being directed to pass through the substance onto the surface portion, thereby modifying the surface chemistry of the surface portion.

In even another embodiment of the present disclosure a method for modifying the surface chemistry of a material includes providing a material. The material includes a surface portion having a surface chemistry. The method also includes exposing the surface portion to a gaseous mixture having a non-atmospheric composition. Furthermore, the method includes exposing the surface portion to at least one laser pulse while the surface portion is exposed to the gaseous mixture. The at least one laser pulse passes through the gaseous mixture onto the surface portion, thereby modifying the surface chemistry of the surface portion.

While multiple embodiments are disclosed, still other embodiments of the disclosed subject matter will become apparent to those skilled in the art from the following detailed description, which shows and describes illustrative embodiments of the disclosure. Accordingly, the drawings and detailed description are to be regarded as illustrative in nature and not restrictive.

Figure 1:
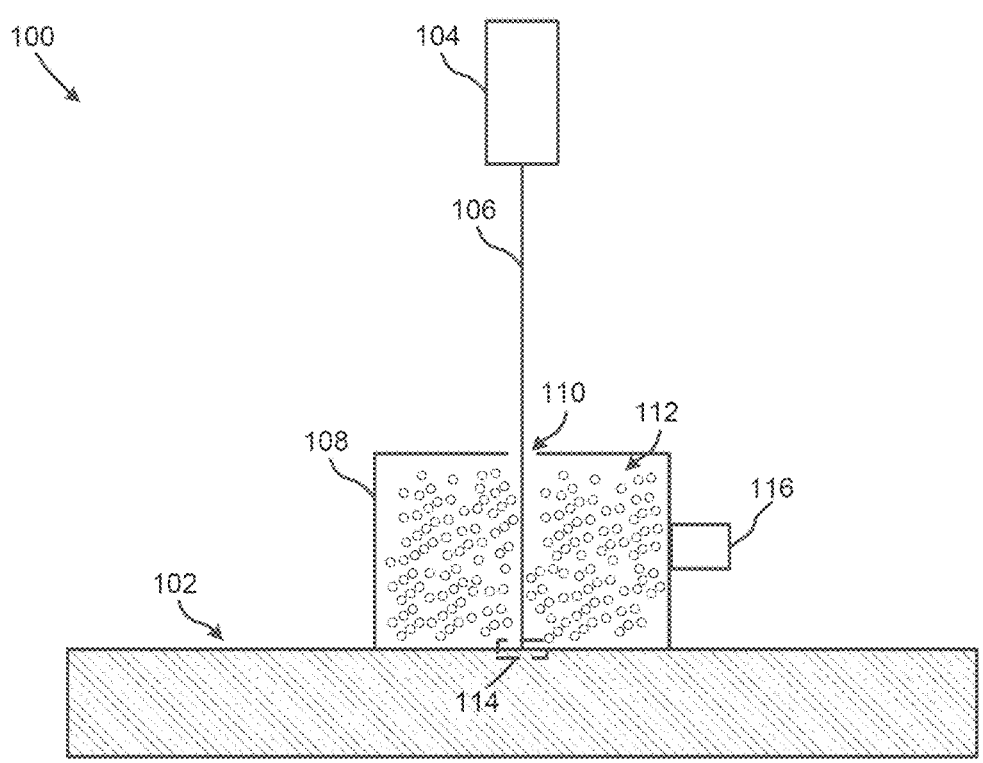
FIG. 1 is a diagram illustrating an example system for modifying the surface chemistry of a material, in accordance with embodiments of the present disclosure.

While the disclosed subject matter is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

As the terms are used herein with respect to ranges of measurements (such as those disclosed immediately above), "about" and "approximately" may be used, interchangeably, to refer to a measurement that includes the stated measurement and that also includes any measurements that are reasonably close to the stated measurement, but that may differ by a reasonably small amount such as will be understood, and readily ascertained, by individuals having ordinary skill in the relevant arts to be attributable to measurement error, differences in measurement and/or manufacturing equipment calibration, human error in reading and/or setting measurements, adjustments made to optimize performance and/or structural parameters in view of differences in measurements associated with other components, particular implementation scenarios, imprecise adjustment and/or manipulation of objects by a person or machine, and/or the like.

Although the term "block" may be used herein to connote different elements illustratively employed, the term should not be interpreted as implying any requirement of, or particular order among or between, various steps disclosed herein unless and except when explicitly referring to the order of individual steps.

Embodiments of the present disclosure include systems and methods for modifying the surface chemistry of a material. In embodiments, the systems and methods also modify the surface profile of the material.

FIG. 1 is a diagram illustrating an exemplary embodiment of a system 100 for modifying the surface chemistry of a material 102, in accordance with the embodiments of the present disclosure. In addition to the material 102, the system 100 includes a pulsed laser 104 that emits at least one laser pulse 106 and an enclosure 108 that includes an aperture 110 and a gaseous mixture 112 having a non-atmospheric composition. The enclosure 108 may be made of different materials, including, but not limited to: various plastics, metals, ceramics, glasses, and/or the like.

In the embodiment shown, the laser pulse 106 from the pulsed laser 104 is directed through the aperture 110 and through the gaseous mixture 112 onto the surface portion 114. The energy irradiance of the laser pulse 106 is sufficient to convert the surface portion 114 to a plasma state. While the surface portion 114 is in a plasma state, a portion of the gaseous mixture 112 located near the surface portion 114 interacts with the surface portion 114. After the laser pulse 106 no longer irradiates the surface portion 114, the interaction of the surface portion 114 and the portion of the gaseous mixture 112 results in an altered surface chemistry of the surface portion 114.

Additionally or alternatively, the enclosure 108 may include a liquid substance that is located proximal to the surface portion 114. In embodiments, the enclosure 108 may be used to contain the liquid substance. However, in other embodiments, an enclosure 108 may not be used in the system 100. In embodiments, the liquid may be a mist, an aerosol, a condensate, a pooling of liquid on the surface portion 114 and/or the like that is enclosed by the enclosure 108 or proximal to the surface portion 114 when an enclosure 108 is not used.

When the liquid substance is proximal to the surface portion 114, the pulsed laser 104 is directed through the liquid substance onto the surface portion 114. The energy irradiance of the laser pulse 106 is sufficient to convert the surface portion 114 to a plasma state. While the surface portion 114 is in a plasma state, a portion of the liquid substance located proximal the surface portion 114 interacts with the surface portion 114. After the laser pulse 106 no longer irradiates the surface portion 114, the interaction of the surface portion 114 and the portion of the liquid substance results in an altered surface chemistry of the surface portion 114. For example, the liquid may be carbon (e.g., liquid hydrocarbon) and the surface chemistry may be, for example, titanium, tantalum, hafnium, zirconium, silicon, aluminum, etc. As such, after the laser pulse 106 no longer irradiates the surface portion 114, the altered surface chemistry of the surface portion 114 may be one or more metal carbides, for example, TiC, TaC, HfC, ZrC, SiC and/or the like.

Additionally or alternatively, a solid substance may be disposed proximal to the surface portion 114. In these embodiments, the system 100 may or may not include the enclosure 108. The solid substance may be a thin layer or coating that is applied to the surface portion 114. In embodiments, a thin layer or coating of a solid substance may be applied to the surface portion 114 using physical vapor deposition, sputtering, evaporative techniques, electron beam deposition, chemical solution deposition, chemical vapor deposition, spin coating and/or the like.

When the solid substance is proximal to the surface portion 114, the pulsed laser 104 is directed through the solid substance onto the surface portion 114. The energy irradiance of the laser pulse 106 is sufficient to convert the surface portion 114 to a plasma state. While the surface portion 114 is in a plasma state, a portion of the solid substance located proximal the surface portion 114 interacts with the surface portion 114. After the laser pulse 106 no longer irradiates the surface portion 114, the interaction of the surface portion 114 and the portion of the solid substance results in an altered surface chemistry of the surface portion 114. For example, the solid may be carbon, boron, etc. and the surface chemistry may be, for example, titanium, hafnium, zirconium, silicon, aluminum, etc. In embodiments where boron is used, after the laser pulse 106 no longer irradiates the surface portion 114, the altered surface chemistry of the surface portion 114 may be one or more metal borides, for example, $TiB_2$, $HfB_2$, $AlB_2$ and/or the like.

As stated above, the energy irradiance of the laser pulse 106 is sufficient to convert the surface portion 114 to a plasma state. The energy irradiance of the laser pulse 106 required to convert the surface portion 114 to a plasma state may depend on the surface chemistry of the surface portion 114. In embodiments, the surface chemistry of the surface portion 114 may be titanium, $Fe_2O_3$, a nickel alloy, copper, ceramic coated steel, aluminum, tantalum, hafnium, zirconium, silicon and/or the like. In order to turn one of these example surface chemistries into a plasma state, the peak pulse power of the pulsed laser 104 may exceed 10 microjoules. This parameter, however, may be varied and is not meant to be limiting.

In addition to the power of the pulsed laser 104, other parameters of the pulsed laser 104 may be varied, as long as the parameters of the pulsed laser 104 are capable of turning the surface portion 114 into a plasma state. Examples of other laser parameters that may be varied include, but are not limited to, pulse duration, wavelength, angle of incidence, spot size (i.e., the diameter of the cross section of the laser beam 106), and frequency of the laser pulses 106 if the pulsed laser 102 emits more than one laser pulse 106. Examples of each of the parameters that are capable of turning the surface portion 114 into a plasma state when the peak pulse power exceeds 10 microjoules include a duration less than or equal to 1,000 femtoseconds, a wavelength between 100 nanometers (nm) and 3000 nm, angles of incidence greater than 0 degrees and less than 90 degrees, spot sizes between 50 microns and 100 microns and frequencies between 50 kilohertz and 200 kilohertz. As another example, the pulsed laser can be a ultrashort pulsed laser and include the following parameters: a duration between 850 fs and 550 fs, a wavelength between 1850 nm and 1240 nm, an angle of incidence between 0 and 20 degrees, a spot size between 85 microns and 55 microns, a frequency between 120 kilohertz and 80 kilohertz, a pulse energy between 40 μJ and 25 μJ, and an average power between 4 Watts and 2 Watts. As even another example, the pulsed laser can be a ultrashort pulsed laser and include the following parameters: a duration between 770 fs and 630 fs, a wavelength between 1705 nm and 1395 nm, an angle of incidence between 0 and 10 degrees, a spot size between 77 microns and 63 microns, a frequency between 110 kilohertz and 90 kilohertz, a pulse energy between 36 μJ and 28 μJ, and an average power between 3.6 Watts and 2.8 Watts. However, these are only examples and not meant to be limiting.

In embodiments, the pulsed laser 104 may be rastered over the surface of the material 102. Accordingly, more than the surface chemistry of the surface portion 114 may be modified using such techniques. The pulsed laser 102 may be rastered over the surface of the material 102 at different speeds and in different patterns. For example, the pulsed laser 104 may be rastered over the surface of the material 102 at speeds of 10 millimeters per second (mm/s), 20 mm/s, 30 mm/s and 40 mm/s, etc. and/or in square patterns, linear patterns, cross-hatch patterns, patterns that pass over a portion of the surface multiple times, etc. Again, however, these are only examples and not meant to be limiting. Instead, the pulsed laser 102 may be rastered at any speed and pattern, as long as the pulsed laser 102 is capable of turning the surface portion 114 into a plasma state.

The diameter of the aperture 110 can be different sizes, as well. In embodiments, the diameter of the aperture 110 is dependent on the spot size of the laser pulse 106 and has a diameter larger than the spot size. Additionally, in embodiments, the aperture 110 has a diameter large enough so that the laser pulse 106 does not experience diffraction as the laser pulse 106 passes through the aperture 110. As such, the energy irradiance of the laser pulse 106 can be focused on the surface portion 114.

Alternatively, in embodiments, the aperture 110 is replaced by a window or other material that is generally optically transparent to the wavelength of the laser pulse 106. As such, the energy irradiance of the laser pulse 106 can pass through the window or other material that is generally optically transparent at the wavelength of the laser pulse 106 and be focused on the surface portion 114.

As shown, the enclosure 108 encloses the gaseous mixture 112 that has a non-atmospheric composition. As used herein, the term "non-atmospheric composition" means a gaseous mixture having a compositional make-up that differs from the ambient atmospheric composition surrounding the systems disclosed herein. For example, in general the atmospheric composition of the Earth's atmosphere is about 78% nitrogen and about 21% oxygen (nitrogen and oxygen are about 99% of the atmospheric composition). As such, exemplary non-atmospheric compositions include (1) a gaseous mixture having greater than 78% nitrogen or less than 78% nitrogen, (2) a gaseous mixture having greater than 21% oxygen or less than 21% oxygen, and (3) a gaseous mixture having more than 95% of nitrogen and oxygen combined or less than 95% of nitrogen and oxygen combined, including gaseous mixture including 0% nitrogen and/or oxygen. Gases included in the gaseous mixtures 112 may also include, but are not limited to, argon and/or hydrogen. However, these are only examples and not meant to be limiting. In embodiments, the gaseous mixture 112 is chosen so that after the interaction of the gaseous mixture 112 with the surface chemistry in a plasma state, a desired altered surface chemistry is obtained. Examples of these desired interactions are discussed below in FIGS. 2A-2B and 4A-4B.

To enclose the gaseous mixture 112, the enclosure 108 can be secured over the surface portion 114 and filled with the gaseous mixture 112. In embodiments, the enclosure 108 is filled with the gaseous mixture 112 by injecting the gaseous mixture 112 into the enclosure 108 through the aperture 110. The aperture 110 may include a closing mechanism so the gaseous mixture 112 cannot escape through the aperture 110 when the pulsed laser 104 is not in use. In other embodiments, the gaseous mixture 112 is introduced into the enclosure 108 through another opening (not shown) in the enclosure 108. Similarly, in embodiments, the opening includes a closing mechanism so the gaseous mixture 112 cannot escape through the opening of the enclosure 108. The enclosure 108 assists in retaining the gaseous mixture in contact with the surface portion. This is useful in many scenarios including when the non-atmospheric gaseous mixture is lighter than the surrounding atmospheric gaseous mixture and when the non-atmospheric gaseous mixture is at a higher pressure than the surrounding atmospheric gaseous mixture.

In embodiments, when an enclosure 108 is used, a liquid substance may be introduced into the enclosure 108 using methods similar to the methods for introducing a gaseous mixture 112 into the enclosure 108.

In addition, the system 100 may include a filter 116 coupled to the enclosure 108. In embodiments, the filter 116 is capable of filtering an undesirable substance from the gaseous mixture 112 and/or liquid substance. For example, if a compound is expelled from the surface portion after the laser pulse 106 irradiates the surface portion, the filter 116 can be designed to filter the compound from the gaseous mixture 112, so that the interaction between the gaseous mixture 112 and the surface portion 114 may be more controlled.

Figure 2A:
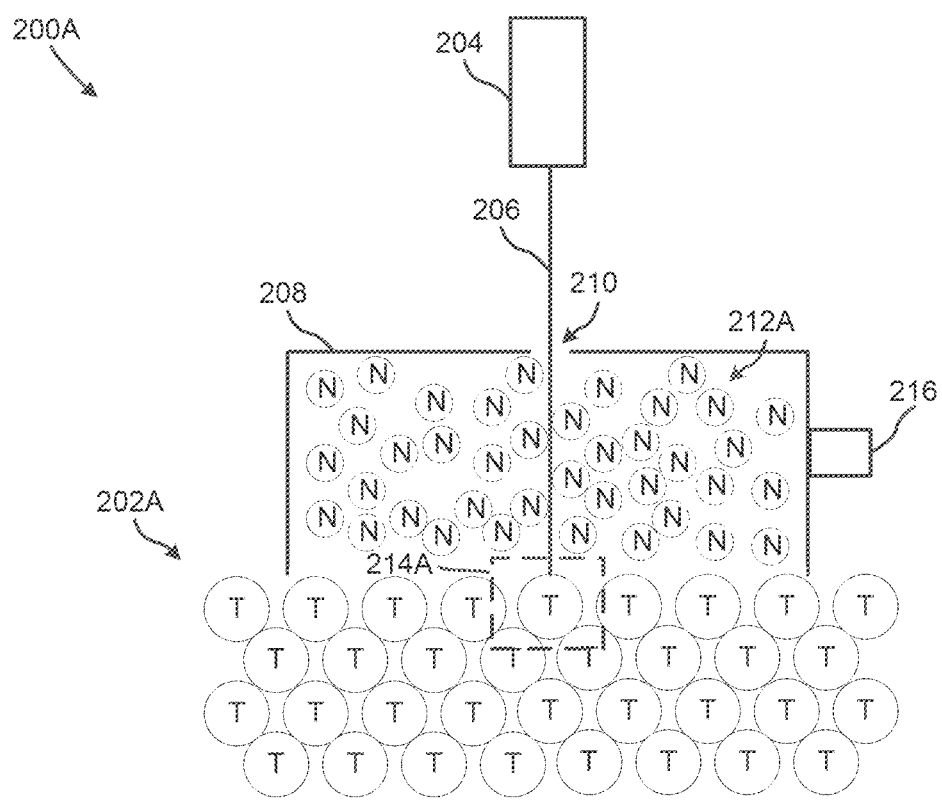
FIGS. 2A-2B are diagrams illustrating example systems for modifying a specific surface chemistry of a material, in accordance with embodiments of the present disclosure.

FIG. 2A is a diagram illustrating an example system 200A for modifying a specific surface chemistry of a material 202A, in accordance with embodiments of the present disclosure. The system 200A includes a material 202A, a pulsed laser 204 that emits at least one laser pulse 206 and an enclosure 208. The enclosure 208 includes an aperture 210 and a gaseous mixture 212A having a non-atmospheric composition. The laser pulse 206 from the pulsed laser 204 is directed through the aperture 210 and through the gaseous mixture 212A onto the surface portion 214A.

Alternatively and similar to above, in embodiments, the aperture 210 is replaced by a window or other material that is generally optically transparent to the wavelength of the laser pulse 206. As such, the energy irradiance of the laser pulse 206 can pass through the window or other material that is generally optically transparent at the wavelength of the laser pulse 106 and be focused on the surface portion 114.

In embodiments, the pulsed laser 204 can have some or all of the same characteristics as the pulsed laser 104 shown in FIG. 1. As shown, the gaseous mixture 212A is composed of nitrogen and the surface chemistry of the surface portion 214A is titanium. In embodiments, the titanium is a titanium oxide, pure titanium that does not include an oxide layer and/or a titanium alloy other than titanium nitride. While the gaseous mixture 212A is shown to have a concentration of 100% nitrogen, in other embodiments, the gaseous mixture 212A has a concentration of less than 100% nitrogen. Similarly, while the surface chemistry of the surface portion 214A is shown to be composed of 100% titanium, in other embodiments, the surface chemistry has a concentration of less than 100% titanium.

The energy irradiance of the laser pulse 206 is sufficient to convert the titanium of the surface portion 214A to a plasma state. While the surface portion 214A is in a plasma state, a portion of the nitrogen in the gaseous mixture 212A located near the surface portion 214A interacts with the titanium of the surface portion 214A. After the laser pulse 206 no longer irradiates the surface portion 214A, the interaction of the titanium and the nitrogen results in an altered surface chemistry of the surface portion 214A.

Additionally, the system 200 may include a filter 216 coupled to the enclosure 208. In embodiments, the filter 216 is capable of filtering an undesirable substance from the gaseous mixture 212 similar to the filter 116 (FIG. 1). Accordingly, the interaction between the gaseous mixture 212 and the surface portion 214 may be more controlled.

Figure 2B:
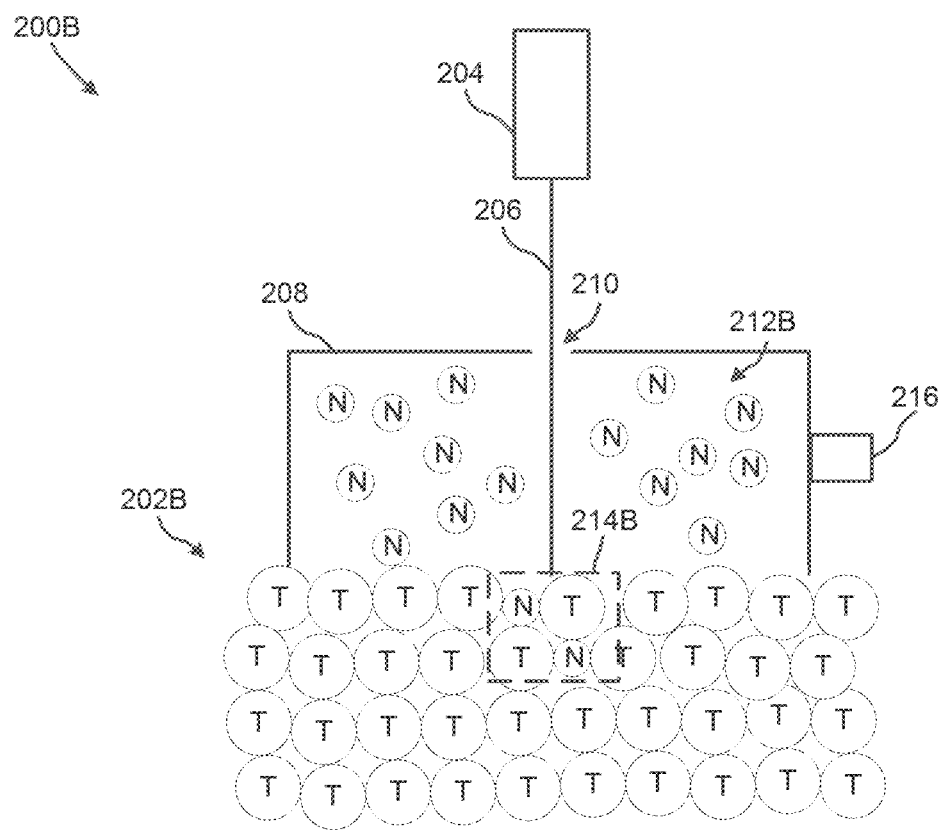

Referring to FIG. 2B, the material 202B of the system 200B having the altered surface portion 214B with the altered surface chemistry is shown. In this embodiment, the laser pulse 206 has altered the surface chemistry from titanium to the altered surface chemistry, titanium nitride. As a result of the interaction, the gaseous mixture 212B after the interaction may contain less nitrogen than the gaseous mixture 212A before the interaction since some nitrogen binds to the titanium, as shown in the altered surface portion 214B. As explained above, titanium nitride is extremely hard and, therefore, may provide advantages over titanium. In embodiments, the pulsed laser 204 used to alter the surface chemistry may be a fiber pulsed laser having the following parameters: a spot size of approximately 70 µm, a pulse duration of approximately 700 fs, a pulse energy of approximately 32 µJ, an average power of 3.2 W, a pulse frequency of approximately 100 kHz and wavelength of 1550 nm. This, however, is only an example of a pulsed laser capable of altering the surface chemistry of the surface portion 214A, 214B. Other pulsed lasers having other parameters may be used, as explained above in FIG. 1.

Figure 3:
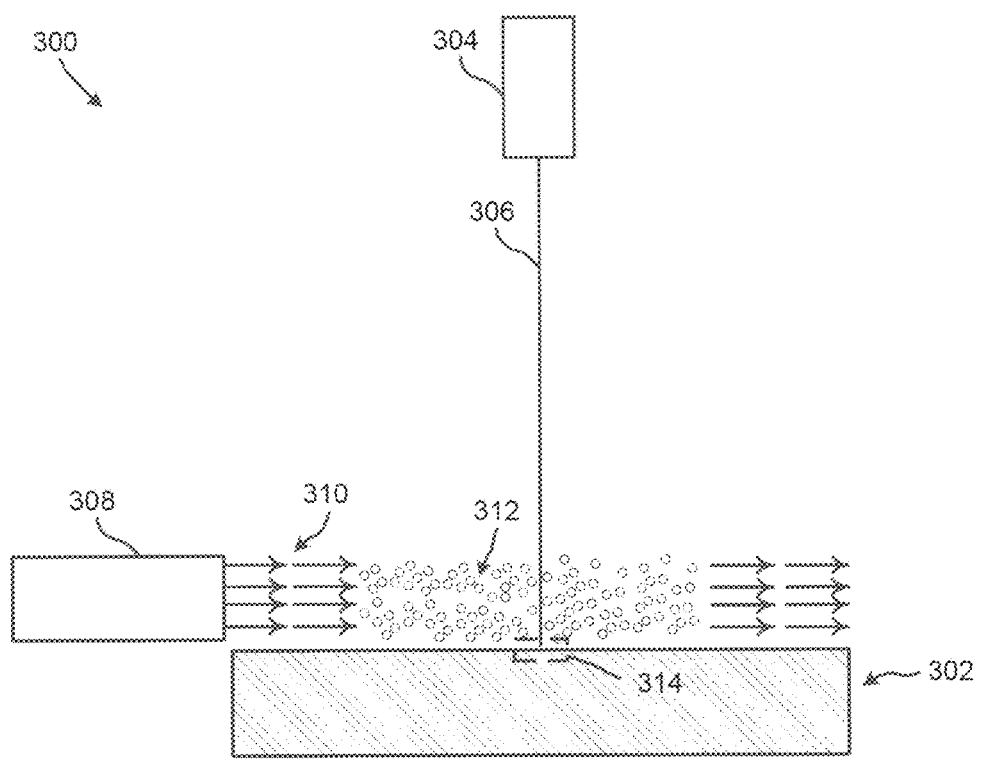
FIG. 3 is a diagram illustrating another example system for modifying the surface chemistry of a material, in accordance with embodiments of the present disclosure.

FIG. 3 is a diagram illustrating another example system 300 for modifying the surface chemistry of a material 302, in accordance with embodiments of the present disclosure. The system 300 includes a pulsed laser 304 that emits at least one laser pulse 306, a gaseous mixture introducer 308 and a material 302. In embodiments, the gaseous mixture introducer 308 introduces a gaseous mixture 312 that has a non-atmospheric composition over a surface portion 314 of the material 302. To do so, the gaseous mixture introducer 308 may emit the gaseous mixture 312 and include a fan or other mechanism that transports the gaseous mixture 312 from the gaseous mixture introducer 308 to the surface portion 314 using a transport system 310. In other embodiments, the gaseous mixture introducer 308 does not emit the gas, but instead includes a fan or other mechanism that transports the gaseous mixture 312 emitted from another device (not shown) to the surface portion 314 using a transport system 310. Exemplary transport systems include conduits and other devices for directing a gaseous mixture. In even other embodiments, the gaseous mixture introducer 308 emits the gaseous mixture 312 and another device (not shown) includes a fan, a conduit, or other device to direct the gaseous mixture 312 to the surface portion 314 using a transport system 310. In even other embodiments, the gaseous mixture introducer 308 emits the gaseous mixture 312 over the surface portion 314 and a fan or other device is not needed to transport the gaseous mixture 312 to the surface portion 314.

Similar to the system 100 shown in FIG. 1, after the gaseous mixture 312 is over the surface portion 314, the laser pulse 306 from the pulsed laser 304 is directed through the gaseous mixture 312 onto the surface portion 314. The energy irradiance of the laser pulse 306 is sufficient to convert the surface portion 314 to a plasma state. While the surface portion 314 is in a plasma state, a portion of the gaseous mixture 312 located near the surface portion 314 interacts with the surface portion 314. After the laser pulse 306 no longer irradiates the surface portion 314, the interaction of the surface portion 314 and the portion of the gaseous mixture 312 results in an altered surface chemistry of the surface portion 314.

The example system 300 shown in FIG. 3 may have some advantages over the system 100 shown in FIG. 1. In the example system 100 shown in FIG. 1, the aperture 112 may interfere with rastering the pulsed laser 104 over a portion of the material 102 that is larger than the surface portion 114. The system 300 shown in FIG. 3, however, may avoid this problem since the system 300 does not include an aperture that the laser pulse 306 is directed through. As such, the pulsed laser 304 of system 300 may be rastered over a portion of the material 302 that is larger than the surface portion 114 in FIG. 1.

Additionally or alternatively, a liquid and/or solid substance may be used in place of, or in addition to, the gaseous mixture 312, as described above in relation to FIG. 1.

Figure 4A:
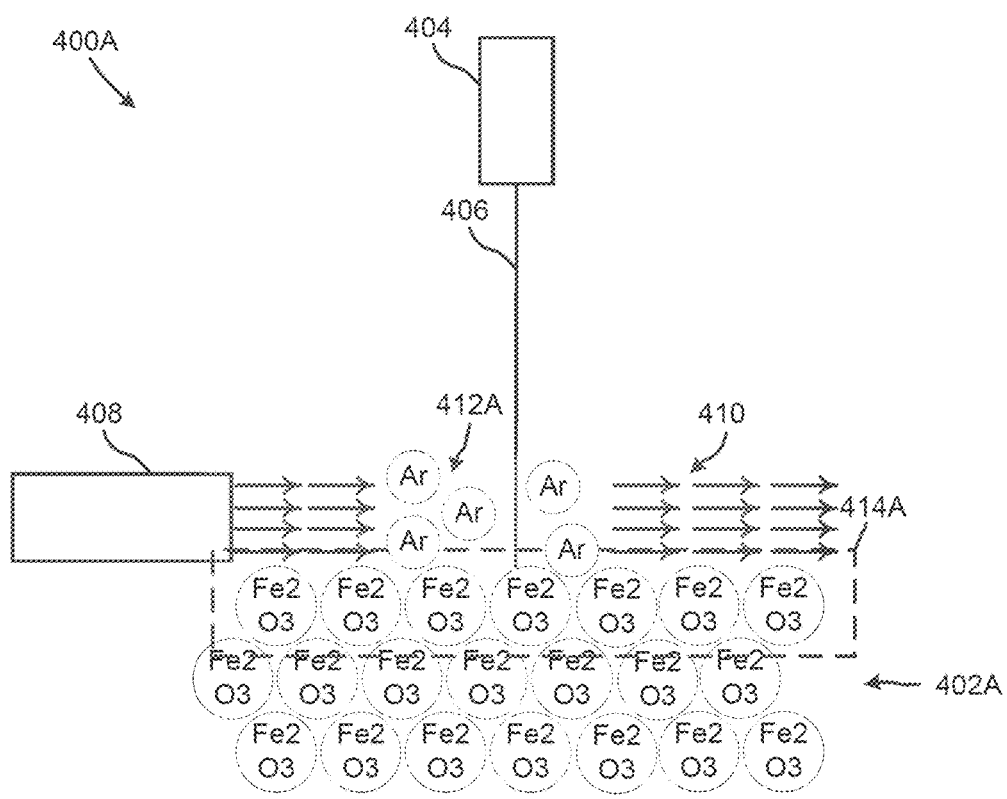
FIGS. 4A-4B are diagrams illustrating example systems for modifying a specific surface chemistry of a material, in accordance with embodiments of the present disclosure.

FIG. 4A is a diagram illustrating an example system 400A for modifying a specific surface chemistry of a material 402A, in accordance with embodiments of the present disclosure. The system 400A includes a pulsed laser 404 that emits at least one laser pulse 406, a gaseous mixture introducer 408 for introducing a gaseous mixture 412A over a surface portion 414A of a material 402A. In embodiments, the gaseous mixture introducer 408 has some or all of the same characteristics as the gaseous mixer introducer 308 shown in FIG. 3. For example, the gaseous mixture introducer 408 can emit the gaseous mixture 412A and have a transport system 410 to transport the gaseous mixture 412A over the surface portion 414A, similar to the gaseous mixture introducer 308 shown in FIG. 3. Exemplary transport systems include conduits and other devices for directing a gaseous mixture. When the gaseous mixture 412 is over the surface portion 414A, the laser pulse 406 from the pulsed laser 404 is directed through the gaseous mixture 412A onto the surface portion 414A. As shown, the surface portion 414A is the top surface of the material 402A. In this example, the pulsed laser 404 is rastered over the top surface of the material 402 to alter the surface chemistry of the entire top surface of the material 402.

Figure 4B:
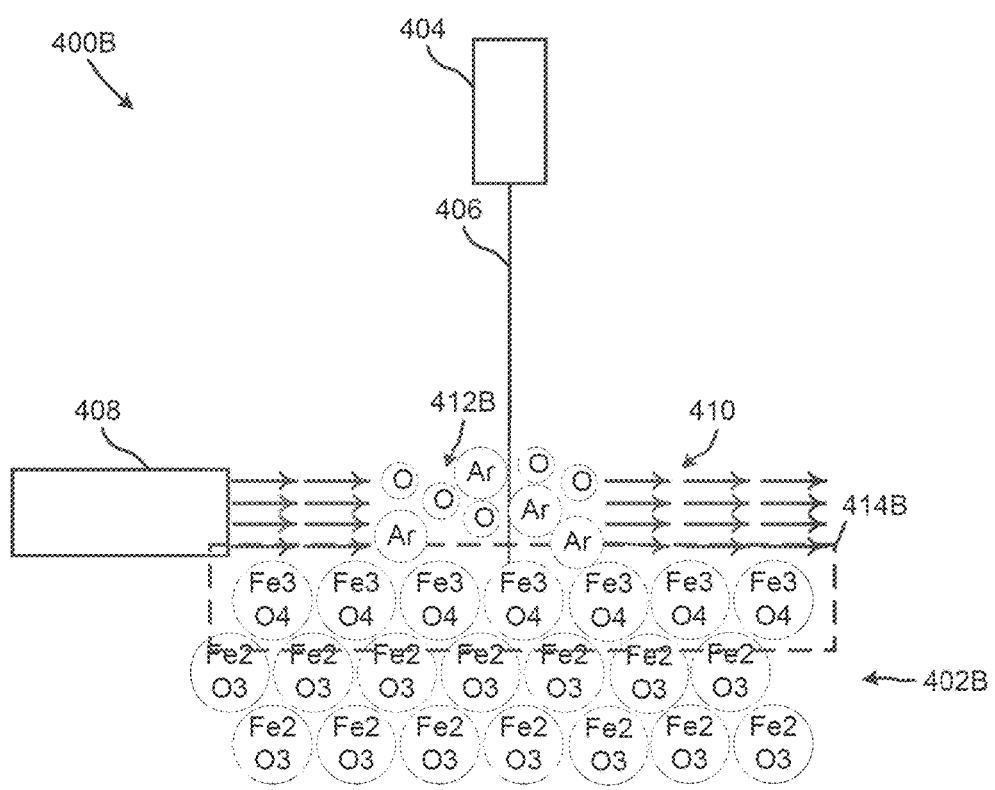

In this example, the gaseous mixture 412A is selected to interact with the surface portion 414A, when the surface portion 412A is irradiated with the at least one laser pulse 406, to alter the surface chemistry of the surface portion 414A from $Fe_2O_3$, (i.e., red iron oxide) to $Fe_3O_4$ (i.e., Magnetite). Exemplary gaseous mixtures that may be used include 100% Argon (as illustrated in FIGS. 4A, 4B), 100% Nitrogen, 100% Oxygen, 100% Hydrogen, or a combination thereof. While the gaseous mixture 412A is shown to be composed of 100% argon, in other embodiments, the gaseous mixture has a concentration of less than 100% argon. Similarly, while the surface chemistry of the surface portion 414A is shown to be composed of 100% $Fe_2O_3$, in other embodiments, the surface chemistry has a concentration of less than 100% $Fe_2O_3$.

The energy irradiance of the laser pulse 406 is sufficient to convert the $Fe_2O_3$ of the surface portion 414A to a plasma state. While the surface portion 414A is in a plasma state, a portion of the argon in the gaseous mixture 416A located near the surface portion 414A may interact with the $Fe_2O_3$ of the surface portion 414A. After the laser pulse 406 no longer irradiates the surface portion 414A, the interaction of the $Fe_2O_3$ and the argon may result in an altered surface chemistry of the surface portion 414A.

Referring to FIG. 4B, the material 402B of system 400B with an altered surface portion 414B is shown. In this embodiment, the laser pulse 406 has altered the surface chemistry of the surface portion 414A from $Fe_2O_3$ to the altered surface chemistry $Fe_3O_4$ (i.e., Magnetite). As a result of an interaction of the surface chemistry with the gaseous mixture 412A, the gaseous mixture 412B after the interaction may contain more oxygen than the gaseous mixture 412A since some oxygen may be ejected from the surface chemistry of the altered surface portion 414B. As explained above, Magnetite is environmentally resistant and, therefore, provides advantages over red iron oxide. In embodiments, the pulsed laser 404 used to alter the surface chemistry may be a fiber pulsed laser having the following parameters: a spot size of approximately 70 µm, a pulse duration of approximately 700 fs, a pulse energy of approximately 32 µJ, an average power of 3.2 W, a pulse frequency of approximately 100 kHz and wavelength of 1550 nm. This, however, is only an example of a pulsed laser capable of altering the surface chemistry of the surface portion. Other pulsed lasers having other parameters may be used, as explained above in FIG. 1.

Figure 5:
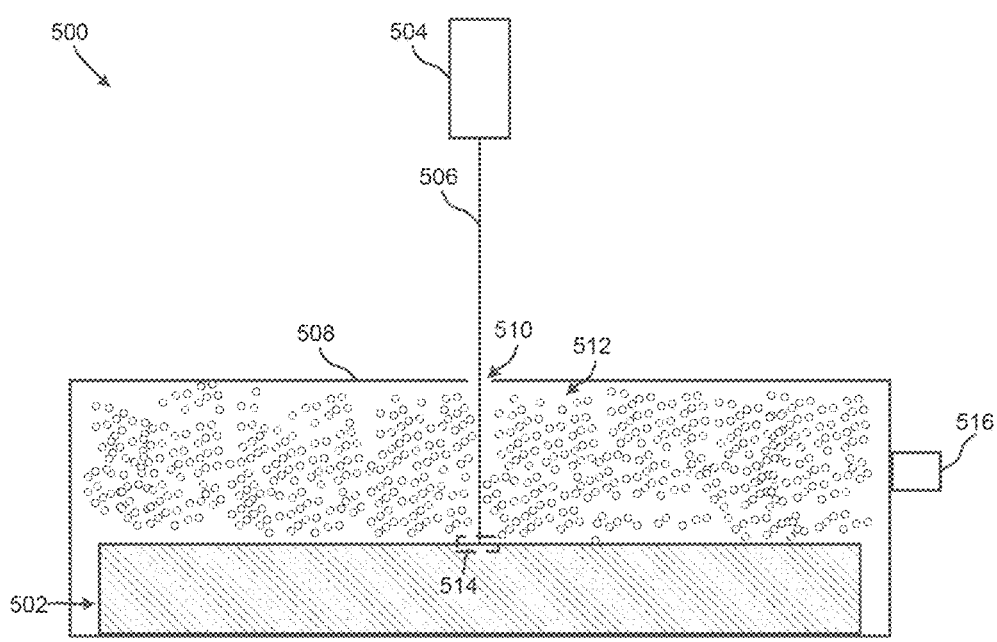
FIG. 5 is a diagram illustrating another example system for modifying a surface chemistry, in accordance with embodiments of the present disclosure.

FIG. 5 is a diagram illustrating another system 500 for modifying the surface chemistry of a material 502, in accordance with the embodiments of the present disclosure. The system 500 includes a pulsed laser 504 that emits at least one laser pulse 506 and an enclosure 508 that includes an aperture 510, a gaseous mixture 512 having a non-atmospheric composition and the material 502. The material 502, the pulsed laser 504, the aperture 510 and the gaseous mixture 512 may have some or all same characteristics, respectively, as the material 102, the pulsed laser 104, the aperture 110 and the gaseous mixture 112 that are described in relation to FIG. 1 above.

Alternatively and similar to above, in embodiments, the aperture 510 is replaced by a window or other material that is generally optically transparent to the wavelength of the laser pulse 506. As such, the energy irradiance of the laser pulse 506 can be project through the window or other material that is generally optically transparent at the wavelength of the laser pulse 506 and be focused on the surface portion 514.

Similar to the embodiments described above, the laser pulse 506 from the pulsed laser 504 is directed through the aperture 510 and the gaseous mixture 512 onto the surface portion 514. The energy irradiance of the laser pulse 506 is sufficient to convert the surface portion 514 to a plasma state. While the surface portion 514 is in a plasma state, a portion of the gaseous mixture 512 located adjacent the surface portion 514 interacts with the surface portion 514. After the laser pulse 506 no longer irradiates the surface portion 514, the interaction of the surface portion 514 and the portion of the gaseous mixture 512 results in an altered surface chemistry of the surface portion 514.

Additionally, the system 500 may include a filter 516 coupled to the enclosure 508. In embodiments, the filter 516 is capable of filtering an undesirable substance from the gaseous mixture 512, similar to the filters 116, 216 (FIGS. 1 and 2, respectively). Accordingly, the interaction between the gaseous mixture 512 and the surface portion 514 may be more controlled.

In contrast to the system 100 shown in FIG. 1, the material 502 is inserted into the enclosure 508. An advantage of the embodiment shown in FIG. 5 may be that the enclosure 508 does not need to be secured to the material 502 at the edges of enclosure 508 and, therefore, may provide better protection against leaks of the gaseous mixture 512.

Alternatively, the embodiment shown in FIG. 1 may provide an advantage over the embodiment shown in FIG. 5 if it is not practical to insert the material into an enclosure. For example, the surface chemistry of a ship hull may be altered, in accordance with the embodiments of the present disclosure, and it may not be practical to insert the ship hull into an enclosure.

Additionally or alternatively, a liquid and/or solid substance may be used in place of, or in addition to, the gaseous mixture 512, as described above in relation to FIG. 1.

Figure 6:
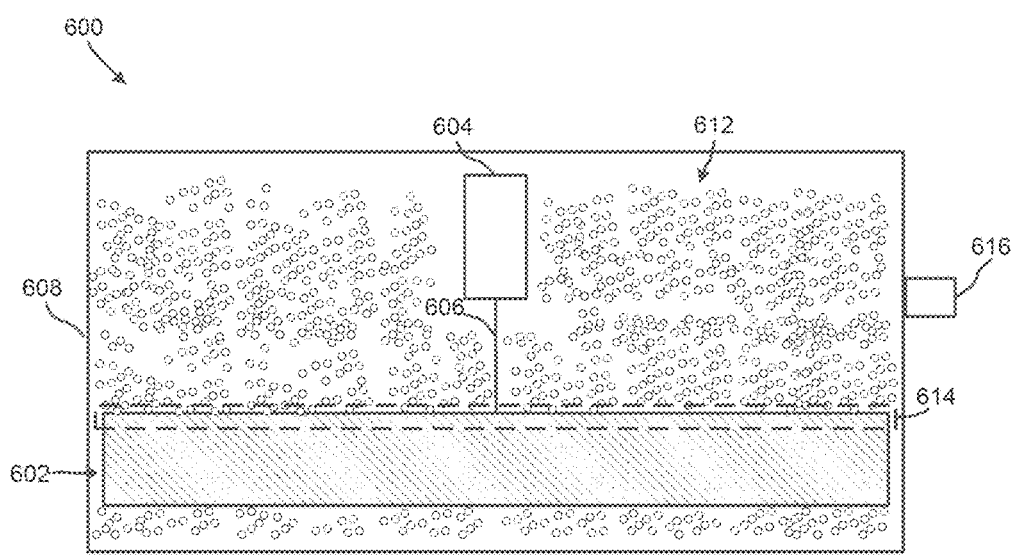
FIG. 6 is a diagram illustrating another example system for modifying a surface chemistry, in accordance with embodiments of the present disclosure.

FIG. 6 is a diagram illustrating another example system 600 for modifying a surface chemistry, in accordance with embodiments of the present disclosure. The system 600 includes a pulsed laser 604 that emits at least one laser pulse 606, an enclosure 608 that includes a non-atmospheric composition and a material 602. The material 602, the pulsed laser 604 and the gaseous mixture 612 may have some or all same characteristics, respectively, as the material 102, the pulsed laser 104 and the gaseous mixture 112 that are described in relation to FIG. 1 above.

Similar to the embodiments described above, the laser pulse 606 from the pulsed laser 604 is directed through the gaseous mixture 612 onto the surface portion 614. The energy irradiance of the laser pulse 606 is sufficient to convert the surface portion 614 to a plasma state. While the surface portion 614 is in a plasma state, a portion of the gaseous mixture 612 located near the surface portion 614 interacts with the surface portion 614. After the laser pulse 606 no longer irradiates the surface portion 614, the interaction of the surface portion 614 and the portion of the gaseous mixture 612 results in an altered surface chemistry of the surface portion 614.

Additionally, the system 600 may include a filter 616 coupled to the enclosure 608. In embodiments, the filter 616 is capable of filtering an undesirable substance from the gaseous mixture 612, similar to the filters 116, 216, 516 (FIGS. 1, 2 and 5, respectively). Accordingly, the interaction between the gaseous mixture 612 and the surface portion 614 may be more controlled.

As shown, the pulsed laser 604 is encased in the enclosure 608. Similar to the example system 300 shown in FIG. 3, the example system 600 shown in FIG. 6 may have some advantages over the systems 100, 500 shown in FIGS. 1 and 5, respectively. In particular, the pulsed laser 604 of system 600 may be rastered over a large surface portion 614 of the material 602 without an aperture (e.g., the apertures 110, 510) interfering with the laser pulse 606.

Alternatively, the embodiment shown in FIG. 1 may provide an advantage over the embodiment shown in FIG. 6 if it is not practical to insert the material into an enclosure.

Additionally or alternatively, a liquid and/or solid substance may be used in place of, or in addition to, the gaseous mixture 612, as described above in relation to FIG. 1.

Figure 7:
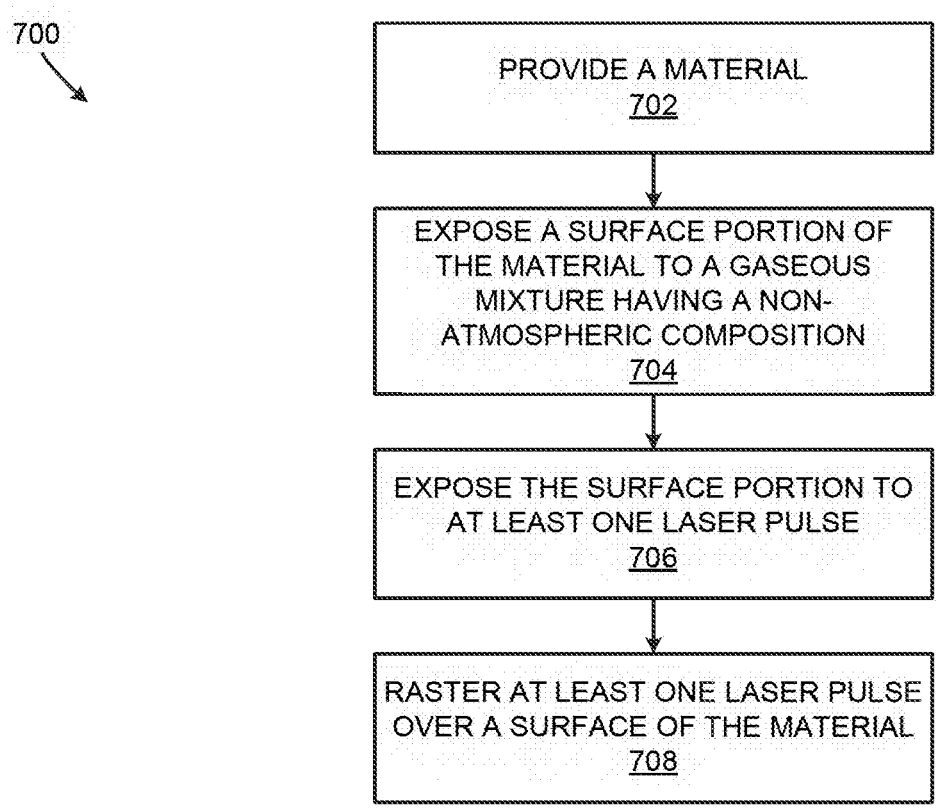
FIG. 7 is a flow diagram depicting an illustrative method for modifying the surface chemistry of a material, in accordance with embodiments of the present disclosure.

FIG. 7 is a flow diagram depicting an illustrative method 700 for modifying the surface chemistry of a material, in accordance with embodiments of the present disclosure. Method 700 includes providing a material 702 (block 702). The material provided includes a surface portion having a surface chemistry. The surface chemistry can either be a metal, a metal-alloy, a non-metal or a combination thereof. A few example types of surface chemistries of the material are the following: titanium, $Fe_2O_3$, aluminum (e.g., Aluminum 2024), copper, stainless steel (e.g., 17-4 stainless steel), carbon steel (e.g., 1018 carbon steel), a ceramic coated steel, tantalum, hafnium, zirconium, silicon and/or the like.

Method 700 further includes exposing the surface portion to a gaseous mixture having non-atmospheric composition (block 704). Additionally or alternatively, a liquid and/or solid substance may be used in place of, or in addition to, the gaseous mixture, as described above in relation to FIG. 1. In embodiments, exposing the gaseous mixture near a surface portion of the material may include enclosing the surface portion and a portion of the space adjacent to the surface portion and adding the gaseous mixture into the enclosure. In embodiments, enclosing the surface portion and a portion of the space adjacent to the surface portion, and adding the gaseous mixture into the enclosure may be done in a similar manner to the systems 100, 500, 600 shown in FIGS. 1, 5 and 6 above which illustrate the portion of space adjacent to the surface portion including the gaseous mixture.

In other embodiments, exposing the surface portion to the gaseous mixture may include injecting the gaseous mixture to a space adjacent to the surface portion. In embodiments, injecting the gaseous mixture to a space adjacent to the surface portion may be done in a similar manner to the system 300 shown in FIG. 3 above.

Similarly, in embodiments, the gaseous mixture can have the same composition as the gaseous mixtures 112, 212A, 212B, 312, 412A, 412B, 512, 612 described above. For example, the gaseous mixture may include a 100% concentration of nitrogen or 100% concentration of argon. Alternatively, the gaseous mixture may include a concentration of nitrogen greater than 78% or a concentration of argon greater than 50%. Gases included in the gaseous mixtures 112 may also include, but are not limited to, oxygen and/or hydrogen. However, these are only examples and not meant to be limiting. In embodiments, the gaseous mixture is chosen so that after the interaction of the gaseous mixture with the surface chemistry of the surface portion, a desired altered surface chemistry is obtained.

Method 700 also includes exposing the surface portion to at least one laser pulse while the surface portion is exposed to the gaseous mixture (block 706). The at least one laser pulse passes through the gaseous mixture onto the surface portion, thereby modifying the surface chemistry of the surface portion. As described in the FIGS. above, the energy irradiance of the laser pulse is sufficient to convert the surface portion to a plasma state. Exemplary systems using pulsed lasers to convert a surface portion to a plasma state are disclosed in U.S. application Ser. No. 14/587,455, entitled "ADHESION IMPROVEMENT VIA MATERIAL NANOSTRUCTURING OR TEXTURIZING," U.S. application Ser. No. 13/604,951, entitled "NANOSTRUCTURED MATERIALS, METHODS, AND APPLICATIONS," U.S. application Ser. No. 13/253,173, entitled "FEMTOSECOND LASER PULSE SURFACE STRUCTURING METHODS AND MATERIALS RESULTING THEREFROM," the entire disclosures of which are expressly incorporated by reference herein. While the surface portion is in a plasma state, a portion of the gaseous mixture located near the surface portion interacts with the surface portion. After the laser pulse no longer irradiates the surface portion, the interaction of the surface portion and the portion of the gaseous mixture results in an altered surface chemistry of the surface portion. Examples of specific chemistries that may be altered include, but are not limited to, changing titanium to titanium nitride and changing $Fe_2O_3$ to $Fe_3O_4$.

In embodiments, the pulsed laser used to emit the laser pulse has some or all of the same characteristics as the pulsed lasers 104, 204, 304, 404, 504, 604 described above in FIGS. 1-6. For example, the pulsed laser can be a ultrashort pulsed laser and include the following parameters: a duration less than or equal to 1,000 femtoseconds (fs), a wavelength between 100 nanometers (nm) and 3000 nm, angles of incidence greater than or equal to 0 degrees and less than 90 degrees, spot sizes between 50 microns and 100 microns and frequencies between 50 kilohertz and 200 kilohertz. As another example, the pulsed laser can be a ultrashort pulsed laser and include the following parameters: a duration between 850 fs and 550 fs, a wavelength between 1850 nm and 1240 nm, an angle of incidence between 0 and 20 degrees, a spot size between 85 microns and 55 microns, a frequency between 120 kilohertz and 80 kilohertz, a pulse energy between 40 µJ and 25 µJ, and an average power between 4 Watts and 2 Watts. As even another example, the pulsed laser can be a ultrashort pulsed laser and include the following parameters: a duration between 770 fs and 630 fs, a wavelength between 1705 nm and 1395 nm, an angle of incidence between 0 and 10 degrees, a spot size between 77 microns and 63 microns, a frequency between 110 kilohertz and 90 kilohertz, a pulse energy between 36 µJ and 28 µJ, and an average power between 3.6 Watts and 2.8 Watts. However, these are only examples and not meant to be limiting. Instead, any pulsed laser capable of turning the surface chemistry of the material into a plasma state may be used.

In embodiments, method 700 may also include rastering at least one laser pulse over a surface of the material (block 708). An advantage to rastering the at least one laser pulse over the surface of the material is so that a larger portion of the surface chemistry may be altered. The pulsed laser emitting the at least one laser pulse may be rastered over the surface of the material at different speeds and in different patterns. For example, the pulsed laser may be rastered over the surface of the material at speeds of 10 millimeters per second (mm/s), 20 mm/s, 30 mm/s and 40 mm/s, etc. and/or in square patterns, linear patterns, cross-hatch patterns, patterns that pass over a portion of the surface multiple times, etc. Again, however, these are only examples and not meant to be limiting. Instead, any speed and/or pattern may be used, as long as the at least one laser pulse is capable of turning the surface chemistry of the material into a plasma state.

In addition to altering the surface chemistry of a material, the systems and method described in FIGS. 1-7 may also alter the surface profile of a material. The following examples shown in FIGS. 10A-13B and described herein are examples of surface profile alteration wherein the surface portion being altered was exposed to an atmospheric gaseous mixture. Similar surface profile structures are produced when the surface portion being altered is exposed to a non-atmospheric gaseous mixture.

Figure 8A:
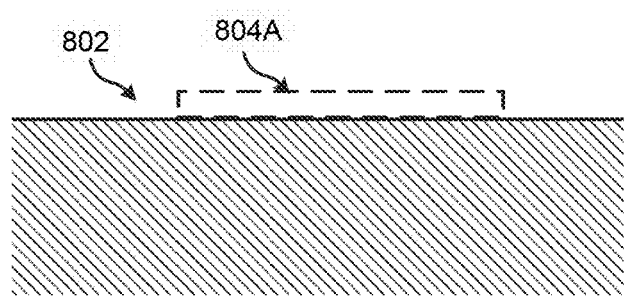
FIGS. 8A-8B are diagrams illustrating example surface profiles of a material, in accordance with embodiments of the present disclosure.
Figure 8B:
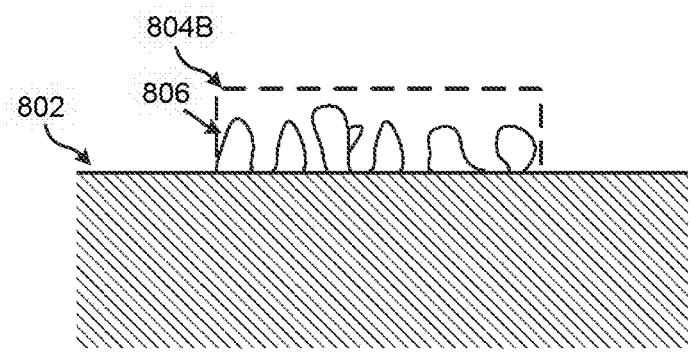

Referring to FIG. 8A, a diagram is shown illustrating an example surface profile 804A of a material 802 before a laser pulse (e.g., laser pulse 106, 206, 306, 406, 506, 606) of a pulsed laser (e.g., pulses laser 104, 204, 304, 404, 504, 604) is incident on the material 802A. As shown, the surface profile 804A is relative smooth. Now, referring to FIG. 8B, a diagram illustrating an example modified surface profile 804B of the material 802 after a laser pulse (e.g., laser pulse 106, 206, 306, 406, 506, 606) of a pulsed laser (e.g., pulsed laser 104, 204, 304, 404, 504, 604) is incident on the material 802A is shown. As shown, the modified surface profile 804B includes a plurality of structures 806 extending out from the surface of the material 802. The plurality of structures 806 has the effect of increasing the surface area of the modified surface profile 804B. As such, the modified surface profile 804B has greater adhesion characteristics than the surface profile 804A. In particular, tests show that the surface adhesion increased by approximately 29% over average unprimed samples by approximately 19% over the best performing unprimed samples, and by approximately 11% over primed samples. "Primed samples" as used herein are samples that have primed using a convention technique such as mechanically abraded, plasma etched, acid etched or treated with a chemical bonding agent.

In embodiments, an ultrashort pulse laser (USPL) system can be used to create the structures 806. In embodiments, the USPL has a laser pulse duration less than 1000 femtoseconds. When the laser pulse irradiates the surface of the material for a short period of time, the laser a-thermally converts the surface material to a plasma state. Then, the material in the plasma state loses energy and produces the structures 806 shown in FIG. 8B. During this process, the thermal effects on the surface of the material 802 are likely less than the thermal effects produced using a non-ultrashort pulse laser that has similar other non-pulse duration parameters to the USPL, so that areas surrounding the surface portion 804B that is irradiated experience less heat transfer. On the contrary, areas surrounding the surface of the material would experience thermal effects if the laser pulse had a longer duration.

Additionally, the modified surface profile 804B has a shear strength on the order of the shear strength of materials that were prepared using mechanical abrasion. For example, the following table illustrates the shear examples shear strengths using conventional techniques and using the systems 100-600 described herein.

| Adhered Materials | Shear Strength (psi) |
| --- | --- |
| Al(2024)-Surface prepared with mechanical abrasion, followed by 3M ™ Scotch-Weld ™ Structural Adhesive Primer EW-5000 | 4,051 ± 547 |
| Al(2024)-Surface prepared using the systems 100-600 described herein | 4,636 ± 91 |
| Al(2024)-Surface prepared using the systems 100-600 described herein, followed by 3M ™ Scotch-Weld ™ Structural Adhesive Primer EW-5000 | 4,656 ± 58 |
| Al(2024)-Surface prepared with mechanical abrasion, followed by 3M AC-130 | 5,314 ± 211 |
| Ti (Ti64)-surface prepared using the systems 100-600 described herein | 4,586 ± 110 |
| Ti (Ti64)-surface prepared with mechanical abrasion, followed by 3M AC-130 | 5,207 ± 324 |

In addition to providing comparable shear strength to mechanical abrasion and chemical priming, the systems 100-600 describe herein may overcome some of the deficiencies of conventional techniques. For example, conventional techniques may suffer from one or more of the following deficiencies: removal of desirable material from a surface, time/labor intensive, requiring costly and hazardous chemicals, difficult to control and possible damage to the treated surface. Additionally, conventional techniques, such as mechanical abrasion, acid etching, plasma etching and chemical bonding, are somewhat limited in the precision, scale, and accuracy that they can be performed. As such, the systems 100-600 described herein, which are able to be controlled precisely, do not require hazardous chemicals and minimally ablate the surface, may provide advantages over conventional techniques for adhesion applications.

In addition to the short duration of the laser pulse, the pulsed laser incident on the material 802A can have some or all of the same characteristics as the laser pulse 106 described above in relation to FIG. 1. For example, in exemplary embodiments, the wavelength of the laser pulse can be between 100 nanometers and 3000 nanometers; the laser pulse can have a peak pulse power greater than 10 microjoules; the incidence angle of the laser can be equal to or greater than 0 degrees; the spot size can be between 50 microns and 100 microns; and, the laser pulses can have a frequency between 50 kilohertz and 200 kilohertz. As another example, the pulsed laser can be a ultrashort pulsed laser and include the following parameters: a duration between 850 fs and 550 fs, a wavelength between 1850 nm and 1240 nm, an angle of incidence between 0 and 20 degrees, a spot size between 85 microns and 55 microns, a frequency between 120 kilohertz and 80 kilohertz, a pulse energy between 40 µJ and 25 µJ, and an average power between 4 Watts and 2 Watts. As even another example, the pulsed laser can be a ultrashort pulsed laser and include the following parameters: a duration between 770 fs and 630 fs, a wavelength between 1705 nm and 1395 nm, an angle of incidence between 0 and 10 degrees, a spot size between 77 microns and 63 microns, a frequency between 110 kilohertz and 90 kilohertz, a pulse energy between 36 µJ and 28 µJ, and an average power between 3.6 Watts and 2.8 Watts.

Figure 9:
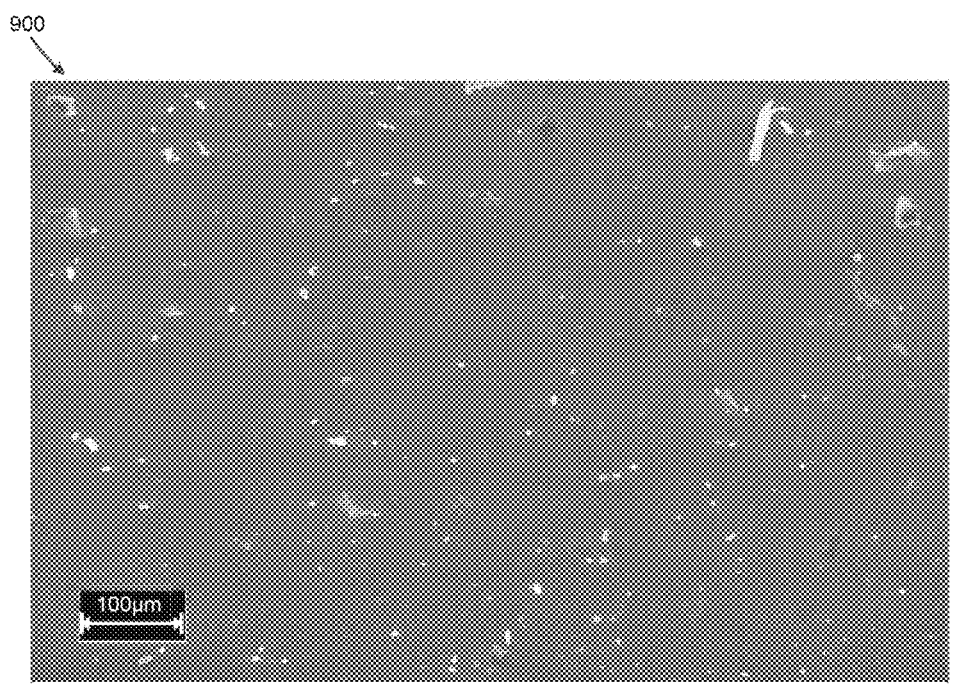
FIG. 9 is a magnified image of a surface profile of aluminum.

FIG. 9 is a magnified image of a surface 900 of aluminum before the surface profile is altered using a pulse laser. As can be seen from the image, the surface profile is generally flat. That is, the surface does not contain protrusions that extend out from the surface.

In contrast, FIGS. 10A-13B are magnified images of modified surface profiles of different materials that were produced having an atmospheric gaseous mixture adjacent to the surface portion to be altered. A pulsed laser that has the following parameters: a spot size of approximately 70 µm, a pulse duration of approximately 700 fs, a pulse energy of approximately 32 µJ, an average power of 3.2 W, a pulse frequency of approximately 100 kHz and wavelength of 1550 nm may be used to produce the surface profiles depicted in FIGS. 10A-13B.

Figure 10A:
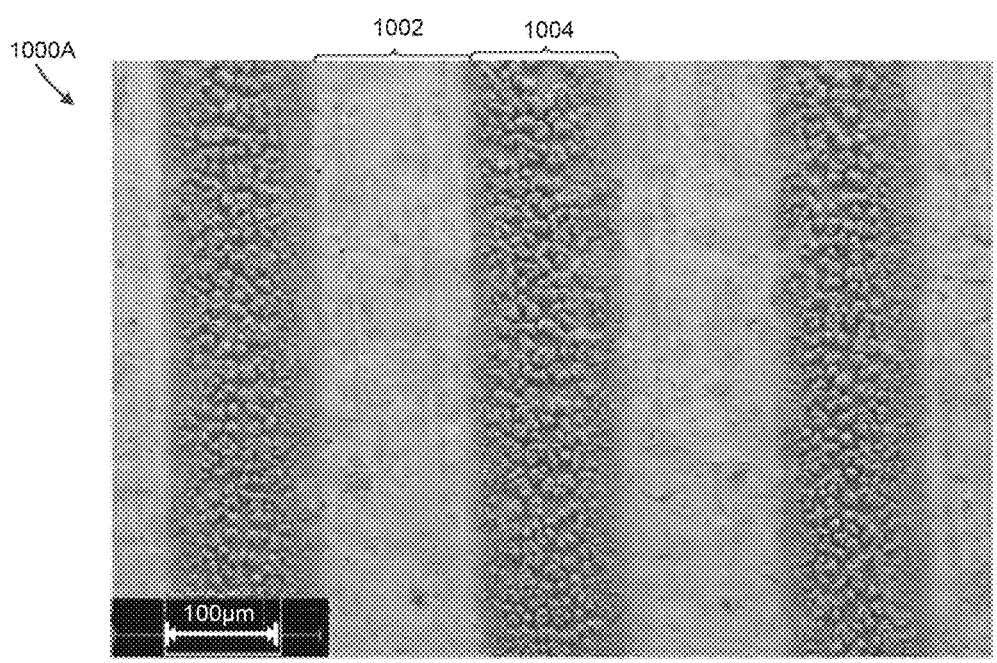
FIGS. 10A-10C are magnified images of modified surface profiles of aluminum that were produced having an atmospheric gaseous mixture adjacent to the surface portion to be altered.
Figure 10B:
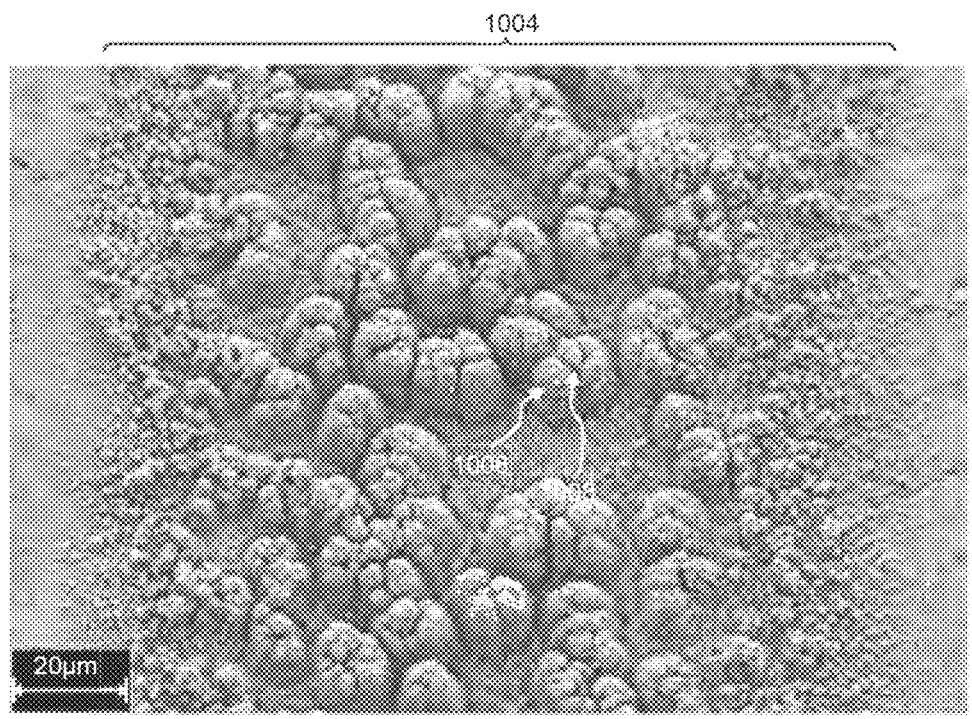
Figure 10C:
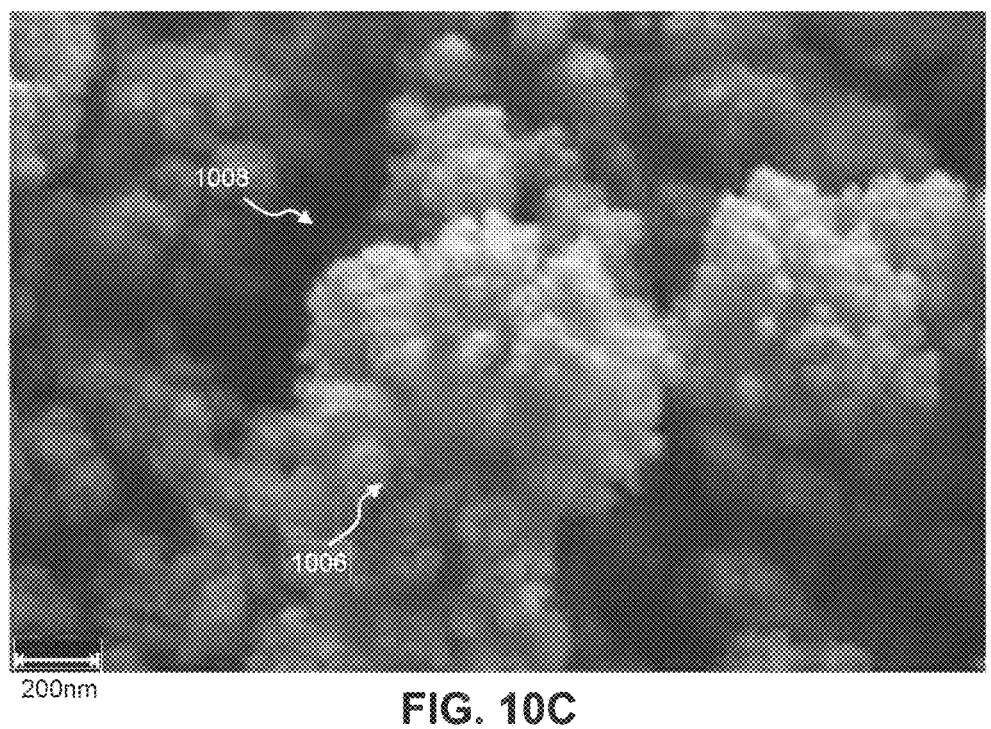

FIGS. 10A-10C are magnified images of modified surface profiles of aluminum that were produced having an atmospheric gaseous mixture adjacent to the surface portion to be altered. As shown, the surface 1000A includes two portions 1002, 1004 that have different surface profiles. The first portion 1002 was not exposed to laser pulses and the second portion 1004 was exposed to laser pulses. The first portion 1002, which was not exposed to laser pulses, has a surface profile that is similar to the surface profile shown in FIG. 9. In particular, the first portion 1002 has a surface profile that is generally flat and does not contain protrusions that extend out from the surface. In contrast, the second portion 1004 includes a plurality of structures that extend out from the surface 1000A.

FIG. 10B-10C are images of the surface 1000A using progressively higher magnifications. As shown, the structures 1006 are generally less than 20 µm in width and less than 20 µm in height. Additionally, the structures 1006 may include cavities 1008. Some of the cavities 1008 in the structures extend to the base of the structures 1006 while other cavities 1008 stop short of extending to the base of the structures 1006. Furthermore, the cavities 1008 generally have a width less than 3-4 µm. The structures 1006 and cavities 1008 are irregularly shaped. As explained above, due to the structures 1006 and cavities 1008, the surface area of the surface 1000A is increased and, therefore, the adhesion and mechanical interlocking characteristics of the surface 1000A have increased.

Figure 11A:
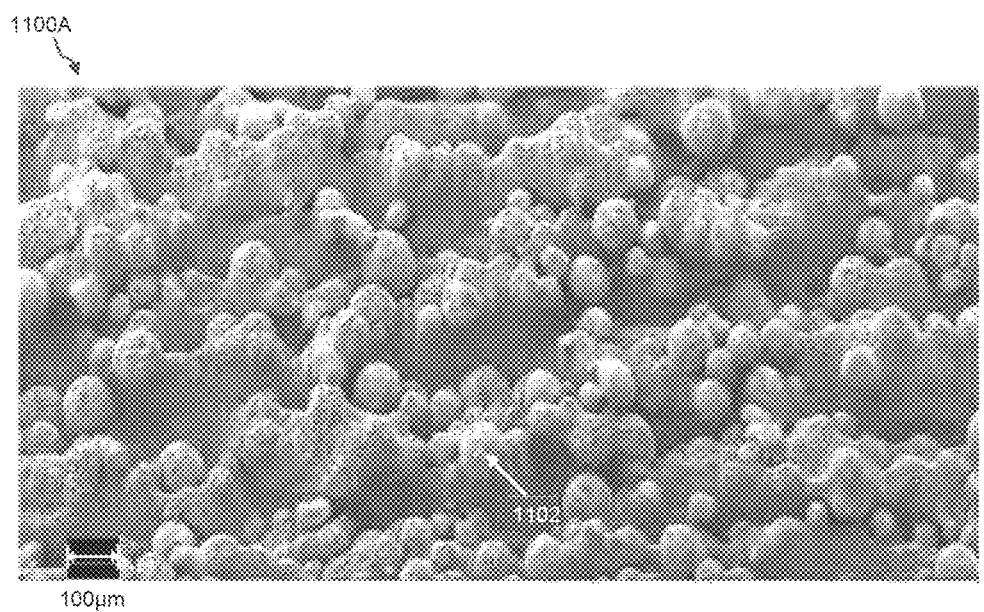
FIGS. 11A-11C are magnified images of modified surface profiles of titanium that were produced having an atmospheric gaseous mixture adjacent to the surface portion to be altered.
Figure 11B:
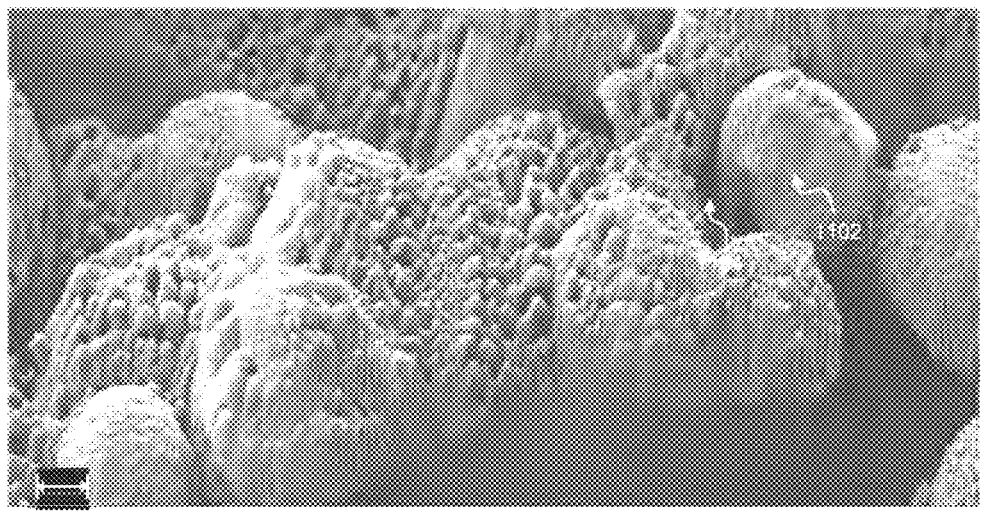
Figure 11C:
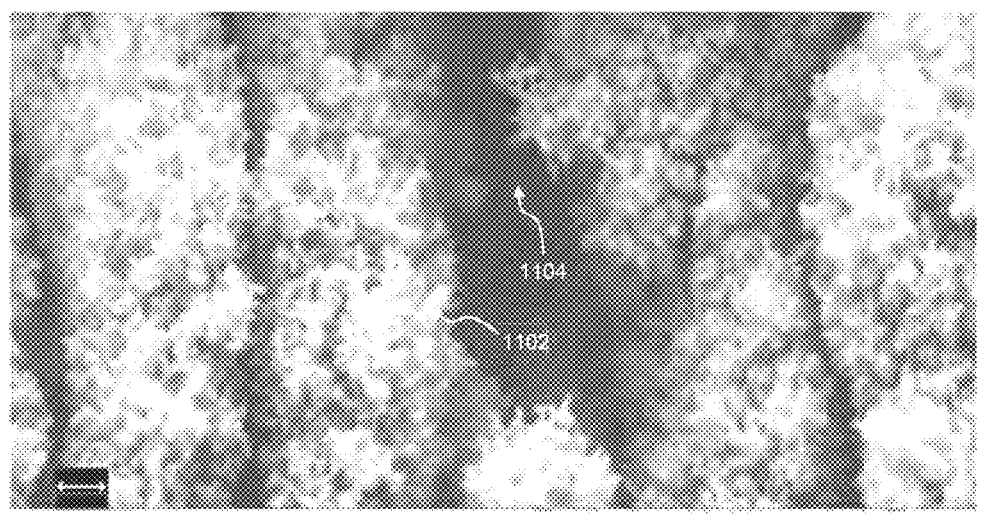

FIGS. 11A-11C are magnified images of modified surface profiles of titanium that were produced having an atmospheric gaseous mixture adjacent to the surface portion to be altered. Similar to the second portion 1004 shown in FIG. 10A, the surface 1100A includes a plurality of structures projecting out from the surface 1100A. The structures 1102 are generally less than 50 µm in width and less than 100 µm in height. Additionally, the structures 1102 includes pores 1104, as can be seen in FIGS. 11B, 11C. The pores 1104 generally have a diameter less than 5 µm. Similar to the structures 1006 and cavities 1008 shown in FIGS. 10A-10C, the structures 1102 and pores 1104 are irregularly shaped. As explained above, due to the structures 1102 and pores 1104, the surface area of the surface 1100A is increased and, therefore, the adhesion and mechanical interlocking characteristics of the surface 1100A have increased.

Figure 12A:
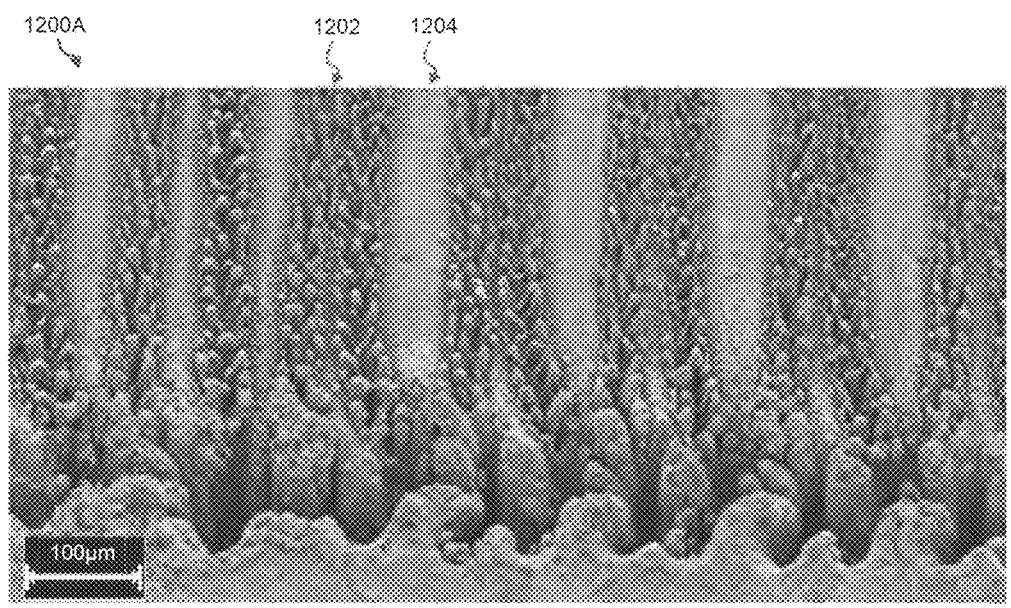
FIGS. 12A-12C are magnified images of modified surface profiles of a nickel alloy that were produced having an atmospheric gaseous mixture adjacent to the surface portion to be altered.
Figure 12B:
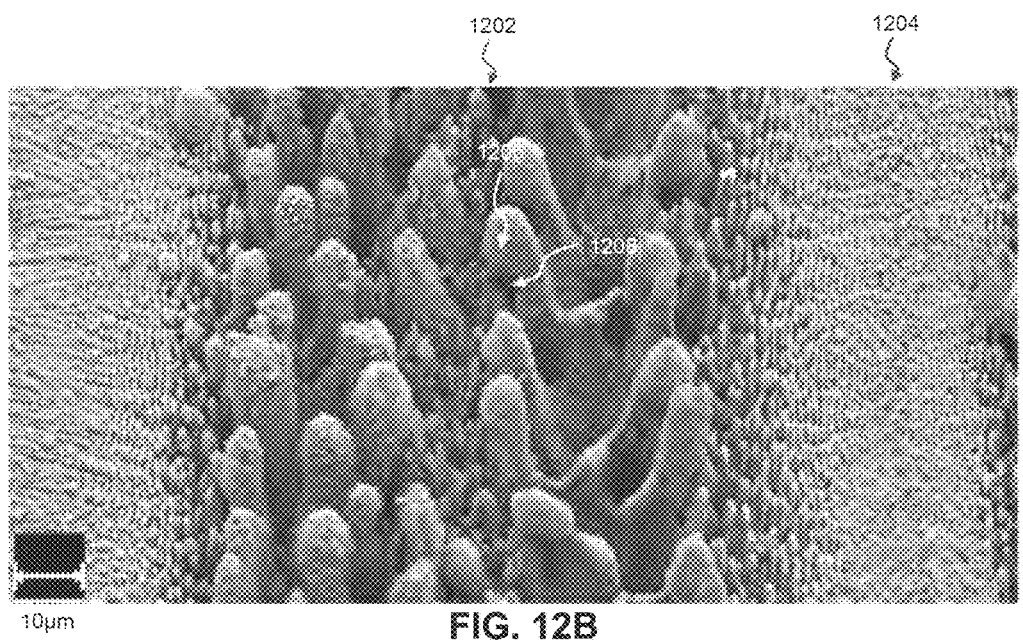
Figure 12C:
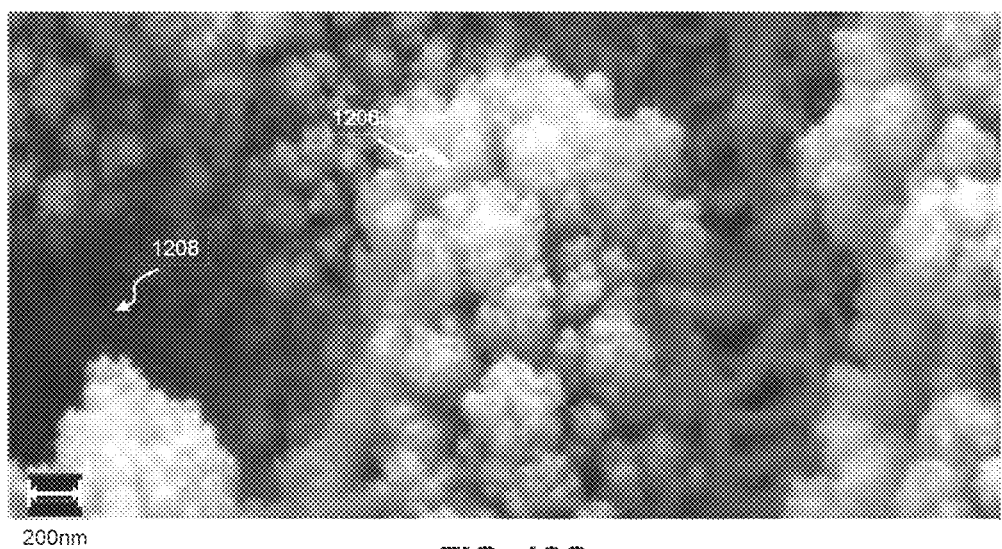

FIGS. 12A-12C are magnified images of modified surface profiles of a nickel alloy that were produced having an atmospheric gaseous mixture adjacent to the surface portion to be altered. As shown, the surface 1200A includes two portions 1202, 1204 that have different surface profiles. The first portion 1204 was not exposed to laser pulses and the second portion 1202 was exposed to laser pulses. The first portion 1204, which was not exposed to laser pulses, has a surface profile that is generally flat and does not contain protrusions that extend out from the surface 1200A. In contrast, the second portion 1204 includes a plurality of structures that extend out from the surface 1000A.

As can be seen in FIGS. 12B-12C, the structures 1206 are generally less than 10 µm in width and less than 20 µm in height. Additionally, the structures 1206 may include cavities 1208. The structures 1206 and cavities 1208 are irregularly shaped. As explained above, due to the structures 1206 and cavities 1208, the surface area of the surface 1200A is increased and, therefore, the adhesion mechanical interlocking characteristics of the surface 1200A have increased.

Figure 13A:
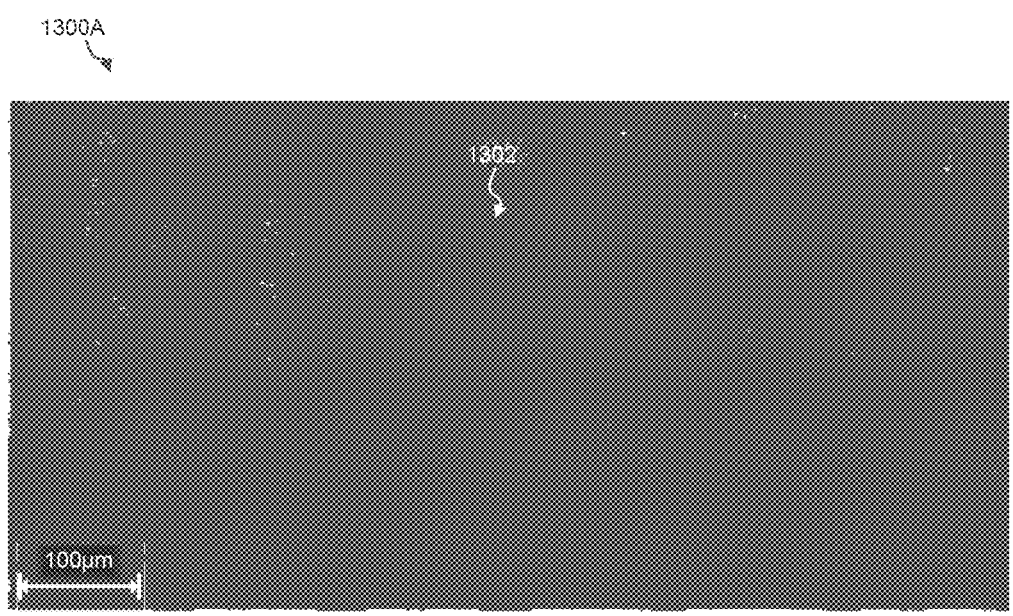
FIGS. 13A-13B are magnified images of modified surface profiles of a another nickel alloy that were produced having an atmospheric gaseous mixture adjacent to the surface portion to be altered.
Figure 13B:
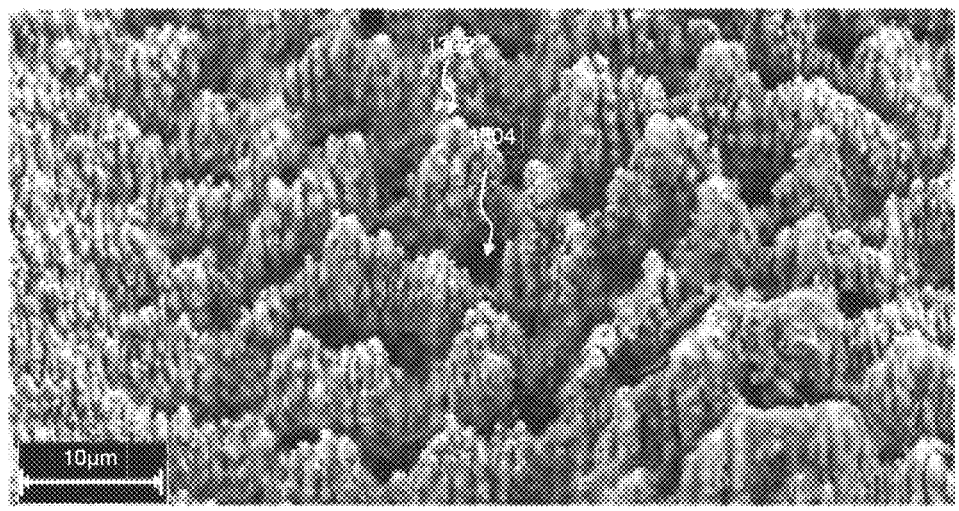

FIGS. 13A-13B are magnified images of modified surface profiles of another nickel alloy that were produced having an atmospheric gaseous mixture adjacent to the surface portion to be altered. As shown, a plurality of structures 1302 project out from the surface 1300A. These structures 1302 have a similar size to the structures 1006. Additionally, the recesses 1304 somewhat resemble the recesses 1008 in the structures 1006. In particular, the recesses 1304 in the structures 1302 resemble cracks, similar to the recesses 1008 in structures 1006. The structures 1302 and recesses 1304 are irregularly shaped. As explained above, due to the structures 1302 and cavities 1304, the surface area of the surface 1300A is increased and, therefore, the adhesion mechanical interlocking characteristics of the surface 1300A have increased.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

What is claimed is:

1. A system for modifying the surface chemistry of a material, the system comprising:
   a material, the material including a surface portion having a surface chemistry;
   an enclosure, the enclosure containing a gaseous mixture having a non-atmospheric composition; and
   a pulsed laser configured to emit at least one laser pulse, the at least one laser pulse being directed to pass through the gaseous mixture onto the surface portion, thereby modifying the surface chemistry of the surface portion.

2. The system of claim 1, the enclosure including an aperture and the pulsed laser being directed to pass through the aperture before passing through the gaseous mixture and onto the surface portion.

3. The system of claim 1, the surface chemistry comprising at least one of: a titanium oxide, a pure titanium and a titanium alloy, the gaseous mixture comprising a concentration of nitrogen greater than 78%, and the modified surface chemistry comprising titanium nitride.

4. The system of claim 1, the surface chemistry comprising $Fe_2O_3$, the gaseous mixture comprising at least one of: argon, nitrogen, oxygen and hydrogen, and the modified surface chemistry comprising $Fe_3O_4$.

5. The system of claim 1, the surface chemistry including at least one of: titanium, a nickel alloy, copper, ceramic coated steel, aluminum, $Fe_2O_3$, tantalum, hafnium, zirconium and silicon.

6. The system of claim 1, the gaseous mixture including one of the following: a concentration of nitrogen greater than 78% or a concentration of argon greater than 50%.

7. The system of claim 1, the at least one pulse having a duration less than 1,000 femtoseconds.

8. The system of claim 1, the at least one laser pulse having a wavelength between 100 nanometers and 3000 nanometers.

9. The system of claim 1, the at least one laser pulse comprising multiple laser pulses and the pulsed laser having a frequency between 50 kilohertz and 200 kilohertz.

10. The system of claim 1, the pulsed laser having a peak pulse power between 10 microjoules and 50 microjoules.

11. The system of claim 1, the at least one laser pulse having a spot size between 50 microns and 100 microns.

12. A system for modifying the surface chemistry of a material, the system comprising:
   a material, the material including a surface portion having a surface chemistry;
   a gaseous mixture introducer configured to introduce a gaseous mixture having a non-atmospheric composition across the surface portion; and
   a pulsed laser configured to emit at least one laser pulse, the at least one laser pulse being directed to pass through the gaseous mixture onto the surface portion, thereby modifying the surface chemistry of the surface portion.

13. The system of claim 12, the surface chemistry comprising at least one of: a titanium oxide, a pure titanium and a titanium alloy, the gaseous mixture comprising a concentration of nitrogen greater than 78%, and the modified surface chemistry comprising titanium nitride.

14. The system of claim 12, the surface chemistry comprising $Fe_2O_3$, the gaseous mixture comprising at least one of: argon, nitrogen, oxygen and hydrogen, and the modified surface chemistry comprising $Fe_3O_4$.

15. The system of claim 12, the surface chemistry including at least one of: titanium, a nickel alloy, copper, ceramic coated steel, aluminum, $Fe_2O_3$, tantalum, hafnium, zirconium and silicon.

16. The system of claim 12, the gaseous mixture including one of the following: a concentration of nitrogen greater than 78% or a concentration of argon greater than 50%.

17. The system of claim 12, the at least one pulse having a duration less than 1,000 femtoseconds.

18. The system of claim 12, the at least one laser pulse having a wavelength between 100 nanometers and 3000 nanometers.

19. The system of claim 12, the at least one laser pulse comprising multiple laser pulses and the pulsed laser having a frequency between 50 kilohertz and 200 kilohertz.

20. The system of claim 12, the pulsed laser having a peak pulse power between 10 microjoules and 50 microjoules.

21. The system of claim 12, the at least one laser pulse having a spot size between 50 microns and 100 microns.

22. A system for modifying the surface chemistry of a material, the system comprising:
   a material, the material including a surface portion having a surface chemistry;
   at least one of a liquid substance and a solid substance disposed proximal to the surface portion; and
   a pulsed laser configured to emit at least one laser pulse, the at least one laser pulse being directed to pass through the substance onto the surface portion, thereby modifying the surface chemistry of the surface portion.

23. The system of claim 22, the surface chemistry comprising at least one of titanium, tantalum, hafnium, zirconium, silicon and aluminum and the liquid substance comprising liquid hydrocarbon.

24. The system of claim 22, the surface chemistry comprising at least one of titanium, tantalum, hafnium, zirconium, silicon or aluminum and the solid substance comprising at least one of carbon or boron.

25. The system of claim 22, the at least one pulse having a duration less than 1,000 femtoseconds.

26. The system of claim 22, the at least one laser pulse having a wavelength between 100 nanometers and 3000 nanometers.

27. The system of claim 22, the at least one laser pulse comprising multiple laser pulses and the pulsed laser having a frequency between 50 kilohertz and 200 kilohertz.

28. The system of claim 22, the pulsed laser having a peak pulse power between 10 microjoules and 50 microjoules.

29. The system of claim 22, the at least one laser pulse having a spot size between 50 microns and 100 microns.

30. A method for modifying the surface chemistry of a material, the method comprising:
   providing a material, the material including a surface portion having a surface chemistry;
   exposing the surface portion to a gaseous mixture having a non-atmospheric composition; and
   exposing the surface portion to at least one laser pulse while the surface portion is exposed to the gaseous mixture, the at least one laser pulse passing through the gaseous mixture onto the surface portion, thereby modifying the surface chemistry of the surface portion.

31. The method of claim 30, wherein exposing the surface portion to the gaseous mixture comprises the steps of:
   enclosing the surface portion and a portion of space adjacent the surface portion; and
   adding the gaseous mixture into the enclosure.

32. The method of claim 30, wherein exposing the surface portion to the gaseous mixture comprises injecting the gaseous mixture to a space adjacent the surface portion.

33. The method of claim 30, wherein providing a material comprises providing a material having a first portion with surface chemistry of at least one of: a titanium oxide, a pure titanium and a titanium alloy, the gaseous mixture comprising a concentration of nitrogen greater than 78%, and the modified surface chemistry comprising titanium nitride.

34. The method of claim 30, wherein providing a material comprises providing a material having a first portion with surface chemistry of $Fe_2O_3$, the gaseous mixture comprising at least one of: argon, nitrogen, oxygen and hydrogen, and the modified surface chemistry comprising $Fe_3O_4$.

35. The method of claim 30, wherein providing a material comprises providing a material having a first portion with surface chemistry including at least one of: titanium, a nickel alloy, copper, ceramic coated steel, aluminum, $Fe_2O_3$, tantalum, hafnium, zirconium and silicon.

36. The method of claim 30, the gaseous mixture including one of the following: a concentration of nitrogen greater than 78% or a concentration of argon greater than 50%.

37. The method of claim 30, the at least one laser pulse comprising a plurality of laser pulses and the method further comprising: rastering the laser pulses over the surface portion.

38. The method of claim 37, wherein rastering the laser pulses comprises following a square pattern over the surface portion using a translation speed between 20 millimeters per second and 40 millimeters per second.

39. The method of claim 30, the at least one pulse having a duration less than 1,000 femtoseconds.

40. The method of claim 30, the at least one laser pulse having a wavelength between 100 nanometers and 3000 nanometers.

41. The method of claim 30, the at least one laser pulse comprising multiple laser pulses and the pulsed laser having a frequency between 50 kilohertz and 200 kilohertz.

42. The method of claim 30, the pulsed laser having a peak pulse power greater than 10 microjoules.

43. The method of claim 30, the at least one laser pulse having a spot size diameter between 50 microns and 100 microns.

* * * * *